United States Patent
Kinoshita et al.

(10) Patent No.: US 10,418,859 B2
(45) Date of Patent: Sep. 17, 2019

(54) CONTROL APPARATUS

(71) Applicant: KYOCERA CORPORATION, Kyoto (JP)

(72) Inventors: Kenta Kinoshita, Yokohama (JP); Shigeru Mesaki, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/120,159

(22) Filed: Aug. 31, 2018

(65) Prior Publication Data
US 2018/0375384 A1 Dec. 27, 2018

Related U.S. Application Data

(62) Division of application No. 15/032,479, filed as application No. PCT/JP2014/078240 on Oct. 23, 2014, now Pat. No. 10,097,042.

(30) Foreign Application Priority Data

Oct. 28, 2013 (JP) ................. 2013-223201
Oct. 28, 2013 (JP) ................. 2013-223741
(Continued)

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 17/00* (2013.01); *H02J 50/40* (2016.02);
(Continued)

(58) Field of Classification Search
CPC .. H02J 50/12; H02J 50/80; H02J 50/90; H02J 50/40; H02J 50/70; H02J 7/025; H02J 17/00
See application file for complete search history.

(56) References Cited

U.S. PATENT DOCUMENTS

2009/0278666 A1  11/2009  Yoda et al.
2011/0193417 A1   8/2011  Hirasaka et al.
(Continued)

FOREIGN PATENT DOCUMENTS

JP   2007-231567 A   9/2007
JP   2009-189231 A   8/2009
(Continued)

OTHER PUBLICATIONS

International Search Report issued in PCT/JP2014/078240; dated Jan. 13, 2015.
(Continued)

*Primary Examiner* — Daniel C Puentes
(74) *Attorney, Agent, or Firm* — Studebaker & Brackett PC

(57) ABSTRACT

A control apparatus is used in a power transmission system for transmitting power with a magnetic resonance manner to a power reception apparatus from a power transmission apparatus. The control apparatus comprises a power control unit configured to control a power transmission state in which transmission power of the power transmission apparatus is controlled in a state in which a power transmission target power reception apparatus is detected, and a test power transmission state in which transmission power of the power transmission apparatus is controlled in a state in which the power transmission target power reception apparatus is not detected.

5 Claims, 20 Drawing Sheets

(30) Foreign Application Priority Data

| Oct. 28, 2013 | (JP) | 2013-223742 |
| Oct. 28, 2013 | (JP) | 2013-223749 |
| Oct. 28, 2013 | (JP) | 2013-223750 |
| Oct. 28, 2013 | (JP) | 2013-223751 |
| Oct. 28, 2013 | (JP) | 2013-223763 |

(51) Int. Cl.

| *H02J 50/90* | (2016.01) |
| *H02J 50/40* | (2016.01) |
| *H02J 17/00* | (2006.01) |
| *H02J 7/02* | (2016.01) |
| *H02J 50/70* | (2016.01) |

(52) U.S. Cl.
CPC .............. *H02J 50/70* (2016.02); *H02J 50/80* (2016.02); *H02J 50/90* (2016.02)

(56) References Cited

U.S. PATENT DOCUMENTS

| 2011/0270462 | A1 | 11/2011 | Amano et al. |
| 2011/0316476 | A1 | 12/2011 | Washiro |
| 2012/0038218 | A1 | 2/2012 | Ichikawa |
| 2012/0326524 | A1 | 12/2012 | Matsumoto et al. |
| 2013/0002038 | A1 | 1/2013 | Lee et al. |
| 2013/0127410 | A1 | 5/2013 | Park et al. |
| 2013/0147281 | A1 | 6/2013 | Kamata |
| 2013/0249479 | A1 | 9/2013 | Partovi |
| 2014/0113689 | A1* | 4/2014 | Lee .................. H04W 52/0277 455/573 |

FOREIGN PATENT DOCUMENTS

| JP | 2009-273307 A | 11/2009 |
| JP | 2010-119246 A | 5/2010 |
| JP | 2011-045190 A | 3/2011 |
| JP | 2011-166883 A | 8/2011 |
| JP | 2011-211866 A | 10/2011 |
| JP | 2011-229265 A | 11/2011 |
| JP | 2012-010524 A | 1/2012 |
| JP | 2012-039800 A | 2/2012 |
| JP | 2013-201852 A | 10/2013 |
| WO | 2013/032129 A1 | 3/2013 |

OTHER PUBLICATIONS

Written Opinion issued in PCT/JP2014/078240; dated Jan. 13, 2015.

Extended European Search Report issued by the European Patent Office dated Sep. 13, 2017, which corresponds to EP14857465.0-1804 and is related to U.S. Appl. No. 15/032,479.

* cited by examiner

| POWER RECEPTION APPARATUS | MAXIMUM RECEPTION POWER | APPLICATION EXAMPLE |
|---|---|---|
| CATEGORY 1 | 1W | SENSOR (TYPE 1) |
| CATEGORY 2 | 2W | SENSOR (TYPE 2) |
| CATEGORY 3 | 5W | CELLULAR PHONE |
| CATEGORY 4 | 10W | SMART PHONE |
| CATEGORY 5 | 20W | TABLET |

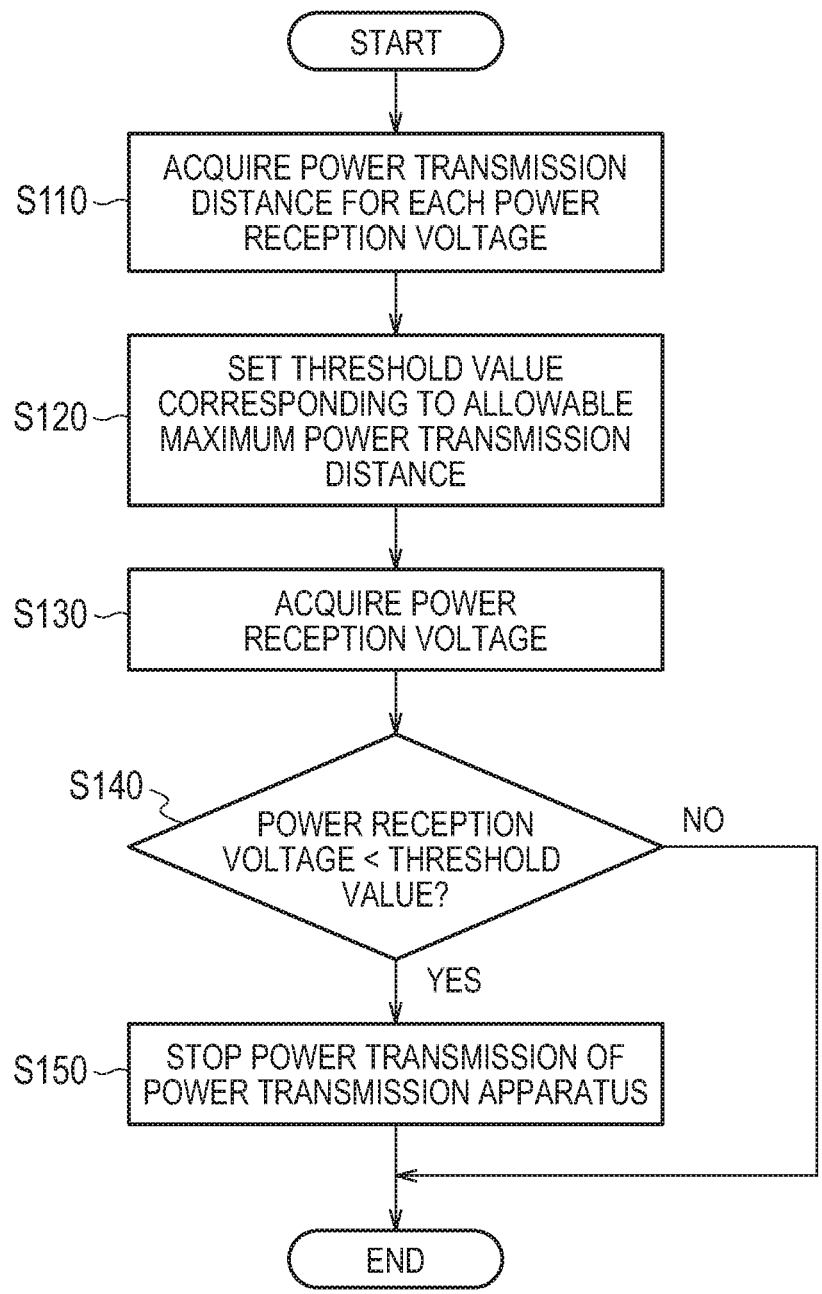

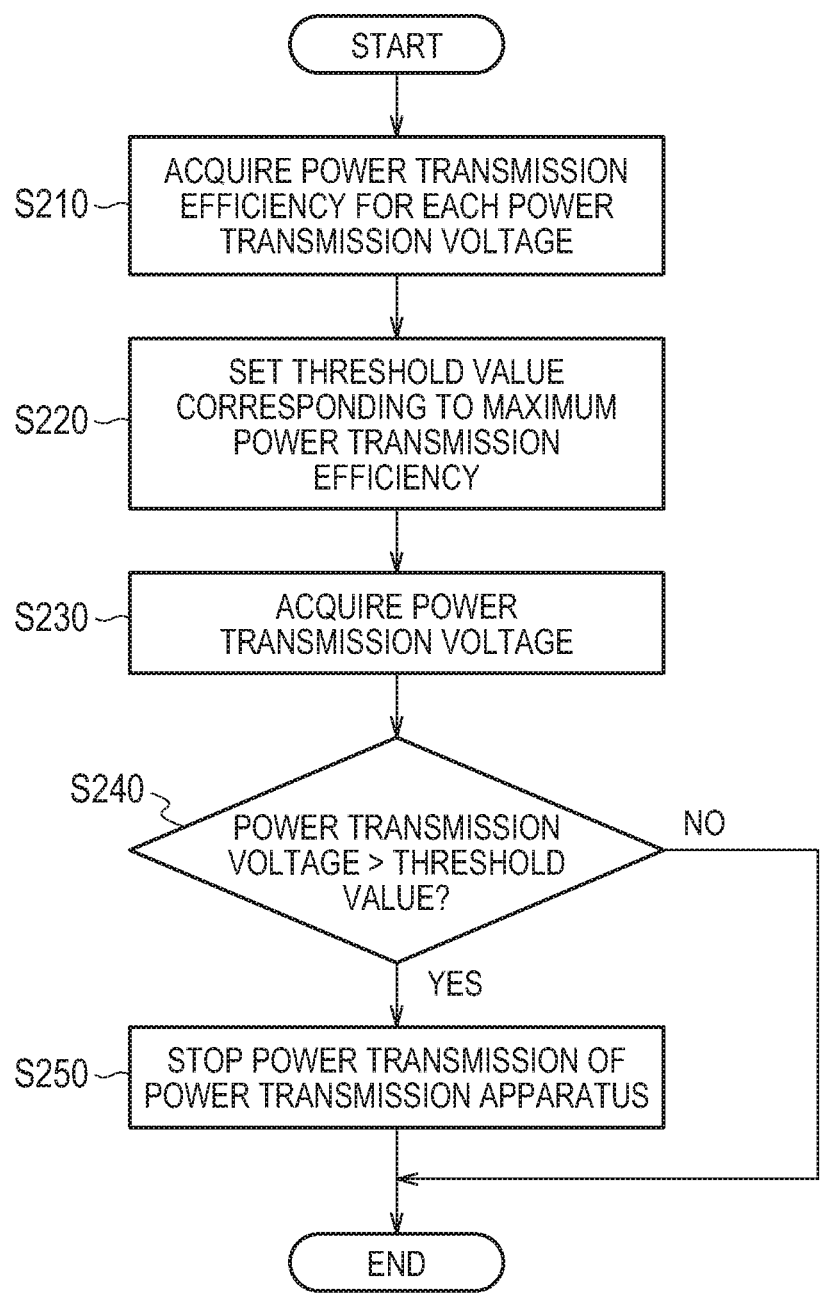

CONTROL APPARATUS

CROSS-REFERENCE TO RELATED APPLICATIONS

This application is a Divisional Application of U.S. patent application Ser. No. 15/032,479 filed on Apr. 27, 2016, which is the U.S. National Phase of PCT Application No. PCT/JP2014/078240 filed on Oct. 23, 2014, which claims benefit of Japanese Patent Application No. 2013-223741 filed on Oct. 28, 2013, Japanese Patent Application No. 2013-223742 filed on Oct. 28, 2013, Japanese Patent Application No. 2013-223749 filed on Oct. 28, 2013, Japanese Patent Application No. 2013-223750 filed on Oct. 28, 2013, Japanese Patent Application No. 2013-223751 filed on Oct. 28, 2013, Japanese Patent Application No. 2013-223763 filed on Oct. 28, 2013, and Japanese Patent Application No. 2013-223201 filed on Oct. 28, 2013, the entirety of all applications hereby incorporated by reference.

TECHNICAL FIELD

The present disclosure relates to a control apparatus used in a power transmission system for transmitting power with a magnetic resonance manner to a power reception apparatus from a power transmission apparatus.

BACKGROUND ART

Conventionally, a technique has been studied of wirelessly transmitting power from a power transmission apparatus to a power reception apparatus. For example, as such a radio power transmission system, a magnetic resonance manner has been devised. Specifically, by adjusting a drive frequency of each resonator so that a resonator of the power transmission apparatus and a resonator of the power reception apparatus resonate with each other at a specific frequency, power is wirelessly transmitted from the power transmission apparatus to the power reception apparatus (for example, Patent Literature 1).

It is considered that the power transmission apparatus does not grasp the power reception apparatus existing around the power transmission apparatus. Alternatively, it is considered that the power transmission apparatus does not grasp the power reception apparatus operating even when grasping the power reception apparatus existing around the power transmission apparatus. Alternatively, it is considered that the power transmission apparatus does not grasp the power reception apparatus newly installed.

Therefore, it is preferable that the power transmission apparatus transmits a search signal for searching a power transmission target power reception apparatus, and detects the power transmission target power reception apparatus by information transmitted from the power reception apparatus.

However, when the power reception apparatus does not have a power storage unit such as a capacitor and a secondary battery, the power reception apparatus is not able to transmit the information if the power is not transmitted from the power transmission apparatus. In addition, when the power stored in the power storage unit is not able to provide power necessary for communication even if the power reception apparatus has the power storage unit such as the capacitor and the secondary battery, the power reception apparatus is not able to transmit the information if the power is not transmitted from the power transmission apparatus.

In this way, due to power shortage of the power reception apparatus, there is a case where the power reception apparatus is not able to communicate, and the power transmission target power reception apparatus may not be detected.

CITATION LIST

Patent Literature

Patent Literature 1: Japanese application publication No. 2011-166883

SUMMARY

A control apparatus according to the present disclosure is used in a power transmission system for transmitting power with a magnetic resonance manner to a power reception apparatus from a power transmission apparatus. The control apparatus comprises a power controller configured to control a first power transmission state in which power is transmitted at a first amount of power, and a second power transmission state in which power is transmitted at a second amount of power greater than the first amount of power.

BRIEF DESCRIPTION OF DRAWINGS

FIG. 20 is a flow diagram illustrating a control method according to the seventh embodiment.

FIG. 21 is a flow diagram illustrating a control method according to a modification of the seventh embodiment.

DESCRIPTION OF EMBODIMENTS

[Summary of First Embodiment]

A control apparatus according to a first embodiment is used in a power transmission system for transmitting power with a magnetic resonance manner to a power reception apparatus from a power transmission apparatus. The control apparatus comprises a power control unit configured to control a power transmission state in which transmission power of the power transmission apparatus is controlled in a state in which a power transmission target power reception apparatus is detected, and a test power transmission state in which transmission power of the power transmission apparatus is controlled in a state in which the power transmission target power reception apparatus is not detected.

In the first embodiment, since power is transmitted to the power reception apparatus by introducing the test power transmission state, the power transmission target power reception apparatus can be detected without depending on a power state of the power reception apparatus.

[First Embodiment]

(Power Transmission System)

Figure 1:
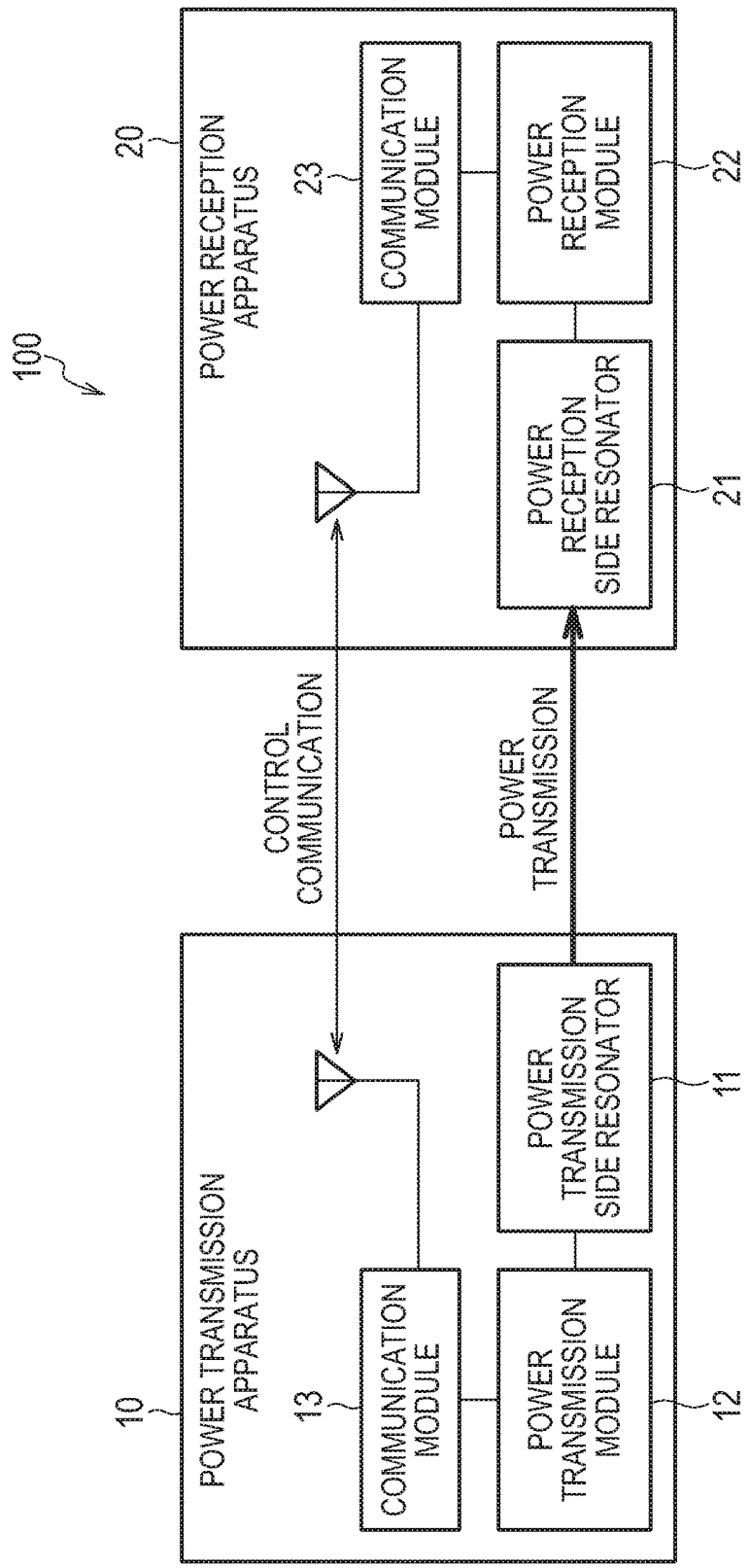
FIG. 1 is a diagram illustrating a power transmission system 100 according to a first embodiment.
Figure 2:
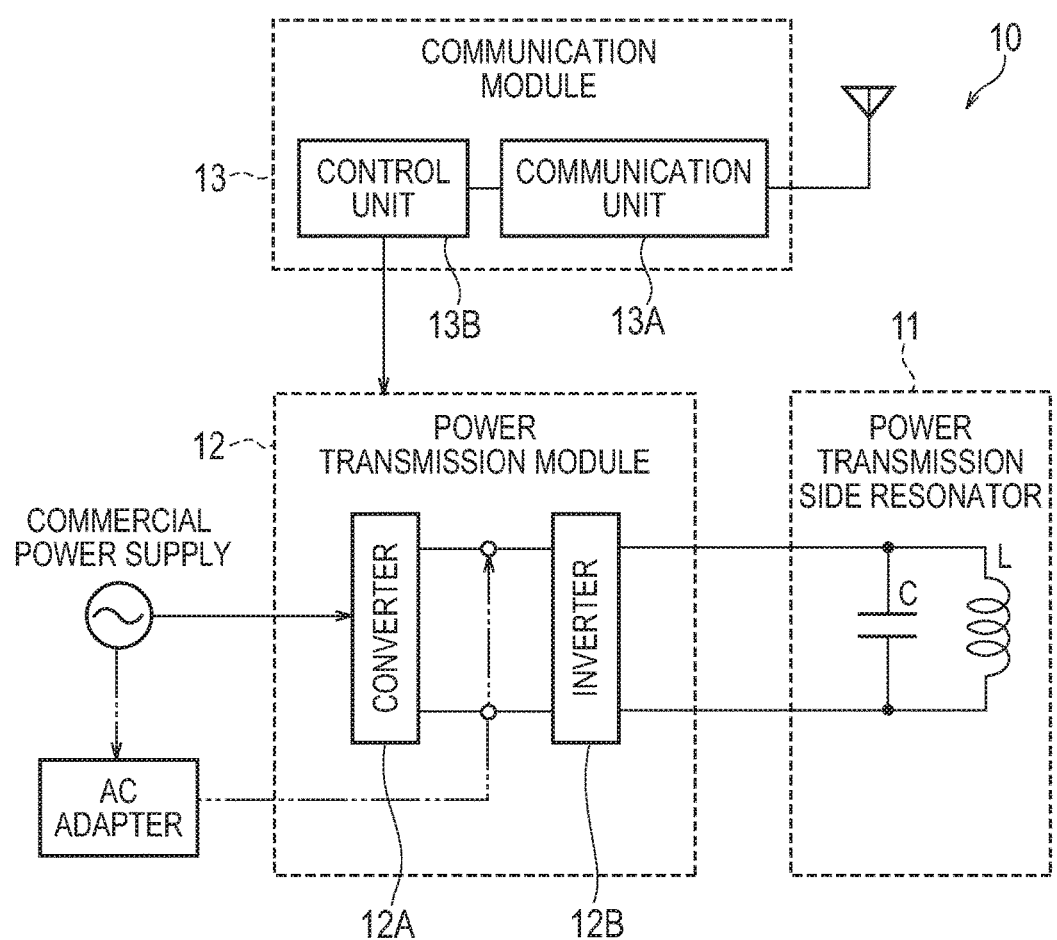
FIG. 2 is a diagram illustrating a power transmission apparatus 10 according to the first embodiment.
Figure 3:
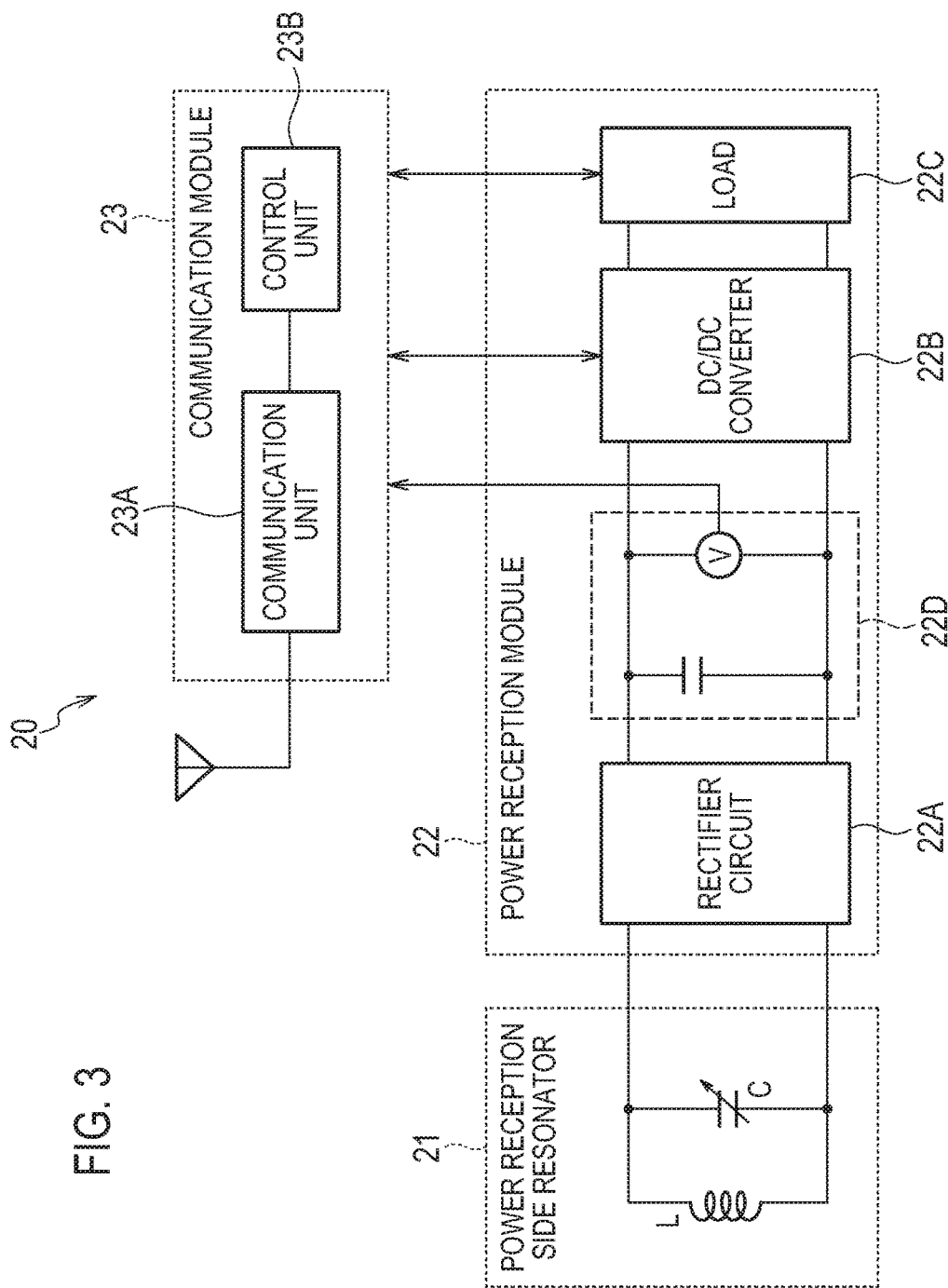
FIG. 3 is a diagram illustrating a power reception apparatus 20 according to the first embodiment.

In the following, the power transmission system according to the first embodiment is described. FIG. 1 is a diagram illustrating a power transmission system 100 according to the first embodiment. FIG. 2 is a diagram illustrating a power transmission apparatus 10 according to the first embodiment. FIG. 3 is a diagram illustrating a power reception apparatus 20 according to the first embodiment.

As illustrated in FIG. 1, the power transmission system 100 includes the power transmission apparatus 10 and the power reception apparatus 20, and is a system for transmitting power with a magnetic resonance manner to the power reception apparatus 20 from the power transmission apparatus 10. In FIG. 1, one power reception apparatus 20 is exemplified; however, a plurality of the power reception apparatuses 20 can be provided to the power transmission system 100. The power reception apparatus 20 has, for example, sensors provided at each position in a room (human detection sensor, temperature sensor, illumination sensor), and is operated by power received from the power transmission apparatus 10. The power transmission apparatus 10 is embedded, for example, in the ceiling or under the floor of the room to supply the power to each of the sensors.

In the first embodiment, the power transmission system 100, although it is not limited thereto, can have an EMS (Energy Management System) configured to control power of a consumer's facility. The EMS includes an HEMS (Home Energy Management System), a BEMS (Building Energy Management System) provided to a building, an FEMS (Factory Energy Management System) provided to a factory, and an SEMS (Store Energy Management System) provided to a store.

As illustrated in FIG. 2, the power transmission apparatus 10 has a power transmission side resonator 11, a power transmission module 12, and a communication module 13.

The power transmission side resonator 11 is a resonator adjusted to resonate at a specific frequency. Specifically, as illustrated in FIG. 2, the power transmission side resonator 11 is configured by a capacitor C and an inductance L (coil). For example, by adjusting capacity of the capacitor C, a resonance frequency of the power transmission side resonator 11 can be adjusted to the specific frequency.

The power transmission module 12 is a module for sending out power. Specifically, as illustrated in FIG. 2, the power transmission module 12 is connected directly to a commercial power supply, or connected to the commercial power supply via an AC adapter.

Here, when the power transmission module 12 is connected directly to the commercial power supply, the power transmission module 12 has a converter 12A and an inverter 12B. The converter 12A and the inverter 12B generate AC power of the specific frequency. In such a case, the converter 12A converts the AC power supplied from the commercial power supply to DC power, and the inverter 12B converts the DC power output from the converter 12A to the AC power of the specific frequency.

On the other hand, when the power transmission module 12 is connected to the commercial power supply via the AC adapter, the power transmission module 12 has only the inverter 12B. The inverter 12B generates the AC power of the specific frequency. In such a case, the inverter 12B converts the DC power output from the converter 12A to the AC power of the specific frequency.

In these cases, magnitude of transmission power of the power transmission apparatus 10 is determined by magnitude of the AC power output from the inverter 12B.

The communication module 13 is a module for communicating with the power reception apparatus 20. The communication module 13 can communicate with the EMS described above. Specifically, the communication module 13 has a communication unit 13A and a control unit 13B.

The communication unit 13A is connected to the power reception apparatus 20 wirelessly or via a wire, and transmits a signal to the power reception apparatus 20, and receives a signal from the power reception apparatus 20. For example, as described later, the communication unit 13A transmits a search signal for searching the power reception apparatus 20. The communication unit 13A transmits an information request for requesting transmission of information for specifying a type of the power reception apparatus 20. On the other hand, the communication unit 13A receives an authentication ID of the power reception apparatus 20. The authentication ID is returned from the power reception apparatus 20 depending on the search signal. The communication unit 13A receives the information for specifying the type of the power reception apparatus 20. The information for specifying the type of the power reception apparatus 20 is returned from the power reception apparatus 20 depending on the information request.

The control unit 13B controls the power transmission module 12 and the communication module 13. For example, the control unit 13B controls transmission power of the power reception apparatus 20 in each state illustrated in FIG. 4 described later. In other words, in the first embodiment, the control unit 13B configures a power control unit configured to control a power transmission state (a power transmission state and an intermittent power transmission state described later) in which the transmission power of the power transmission apparatus 10 is controlled in a state in which the power transmission target power reception apparatus 20 is detected, and a test power transmission state in which the transmission power of the power transmission apparatus 10 is controlled in a state in which the power transmission target power reception apparatus 20 is not detected. In addition, the control unit 13B controls the transmission power of the power transmission apparatus 10, based on the information acquired by the communication unit 13A. Incidentally, the control unit 13B can be included in the power transmission module 12 instead of being included in the communication module 13. In addition, the control unit 13B can be provided to another control apparatus from the communication module 13 and the power transmission module 12, and the control apparatus can control the communication module 13 and the power transmission module 12.

Here, it is preferable that the power transmission target power reception apparatus 20 is a power reception apparatus 20 authenticated by the power transmission apparatus 10 (control apparatus). Therefore, it is preferable that the number of power transmission target power reception apparatuses 20 is the number of power reception apparatuses 20 authenticated by the power transmission apparatus 10 (control apparatus).

Here, it is preferable that the control unit 13B controls power transmission of the power transmission apparatus 10 to continuously transmit when the power transmission target power reception apparatus 20 does not have a power storage unit. On the other hand, it is preferable that the control unit 13B controls power transmission of the power transmission apparatus 10 to intermittently transmit when the power transmission target power reception apparatus 20 has the power storage unit. The control unit 13B can combine continuous power transmission and intermittent power transmission when the power reception apparatus 20 not having the power storage unit and the power reception apparatus 20 having the power storage unit are mixed.

The control unit 13B controls a power transmission interval based on at least one of the number of power transmission target power reception apparatuses 20 and the type of the power transmission target power reception apparatus 20, when controlling power transmission of the power transmission apparatus 10 to intermittently transmit. For example, the control unit 13B shortens the power transmission interval, as the number of power transmission target power reception apparatuses 20 increases. Alternatively, the control unit 13B shortens the power transmission interval as maximum reception power of the power transmission target power reception apparatus 20 is greater.

It is preferable that the type of the power transmission target power reception apparatus 20 is identified by information indicating the maximum reception power of the power transmission target power reception apparatus 20, whether or not the power transmission target power reception apparatus 20 has the power storage unit, or capacity of the power storage unit included in the power transmission target power reception apparatus 20. Here, the reception power means power received by the power reception apparatus from the power transmission apparatus, and the maximum reception power means maximum power received by the power reception apparatus from the power transmission apparatus. Incidentally, here, as a parameter for specifying the type of the power reception apparatus 20, the maximum reception power of the power transmission target power reception apparatus 20 has been mentioned; however, it is not limited thereto; it can be necessary power for executing a predetermined control by the power reception apparatus 20, that is, necessary reception power.

For example, the control unit 13B increases the transmission power of the power transmission apparatus 10, as the number of power transmission target power reception apparatuses 20 is greater. Here, the transmission power means power to be sent out from the power transmission apparatus. Alternatively, the control unit 13B increases the transmission power of the power transmission apparatus 10, as the maximum reception power of the power transmission target power reception apparatus 20 is greater.

Here, it is preferable that the control unit 13B controls the transmission power of the power transmission apparatus 10 to continuously transmit when the power transmission target power reception apparatus 20 does not have the power storage unit. On the other hand, it is preferable that the control unit 13B controls the transmission power of the power transmission apparatus 10 to intermittently transmit when the power transmission target power reception apparatus 20 has the power storage unit. The control unit 13B can combine continuous power transmission and intermittent power transmission when the power reception apparatus 20 not having the power storage unit and the power reception apparatus 20 having the power storage unit are mixed.

The control unit 13B controls the power transmission interval based on at least one of the number of power transmission target power reception apparatuses 20 and the type of the power transmission target power reception apparatus 20, when controlling the transmission power of the power transmission apparatus 10 to intermittently transmit. For example, the control unit 13B shortens the power transmission interval, as the number of power transmission target power reception apparatuses 20 increases. Alternatively, the control unit 13B shortens the power transmission interval, as the maximum reception power of the power transmission target power reception apparatus 20 is greater.

As illustrated in FIG. 1, the power reception apparatus 20 has a power reception side resonator 21, a power reception module 22, and a communication module 23.

The power reception side resonator 21 is a resonator adjusted to resonate at a specific frequency. Specifically, as illustrated in FIG. 3, the power reception side resonator 21 is configured by the capacitor C and the inductance L (coil). For example, by adjusting capacity of the capacitor C, a resonance frequency of the power reception side resonator 21 can be adjusted to the specific frequency.

The power reception module 22 is a module for receiving power. Specifically, as illustrated in FIG. 3, the power reception module 22 has a rectifier circuit 22A, a DC/DC converter 22B, a load 22C, and a power storage unit 22D.

The rectifier circuit 22A converts DC power supplied from the power reception side resonator 21 to AC power. The DC/DC converter 22B performs step-up conversion or step-down conversion of the power supplied from the rectifier circuit 22A. The load 22C is operated by the power transmitted by the power transmission apparatus 10 and supplied from the DC/DC converter 22B, and is, for example, the sensors described above. The power storage unit 22D stores the power transmitted by the power transmission apparatus 10 and supplied from the rectifier circuit 22A. The power storage unit 22D is, for example, an electric double layer capacitor, a secondary battery, or the like.

In FIG. 3, a case is exemplified in which the power reception module 22 has the power storage unit 22D; however, the embodiment is not limited thereto. That is, the power reception module 22 may not have the power storage unit 22D.

The communication module 23 is a module for communicating with the power transmission apparatus 10. The communication module 23 can communicate with the EMS described above. It should be noted that the communication module 23 is operated by the power received from the power transmission apparatus 10. Specifically, the communication module 23 has a communication unit 23A and a control unit 23B.

The communication unit 23A is connected to the power transmission apparatus 10 wirelessly or via a wire, and transmits a signal to the power transmission apparatus 10, and receives a signal from the power transmission apparatus 10. For example, as described later, the communication unit 23A receives the search signal for searching the power reception apparatus 20. The communication unit 23A receives an information request for requesting transmission of information for specifying the type of the power reception apparatus 20. On the other hand, the communication unit 23A transmits an authentication ID of the power reception apparatus 20 depending on the search signal. The communication unit 23A transmits the information for specifying the type of the power reception apparatus 20 depending on the information request.

The control unit 23B controls the power reception module 22 and the communication module 23. For example, the control unit 23B supplies appropriate power to the load 22C by control of the DC/DC converter 22B. Alternatively, the control unit 13B controls the load 22C depending on an instruction received from the EMS.

(State Transition of Power Transmission Apparatus)

Figures 4, 5:
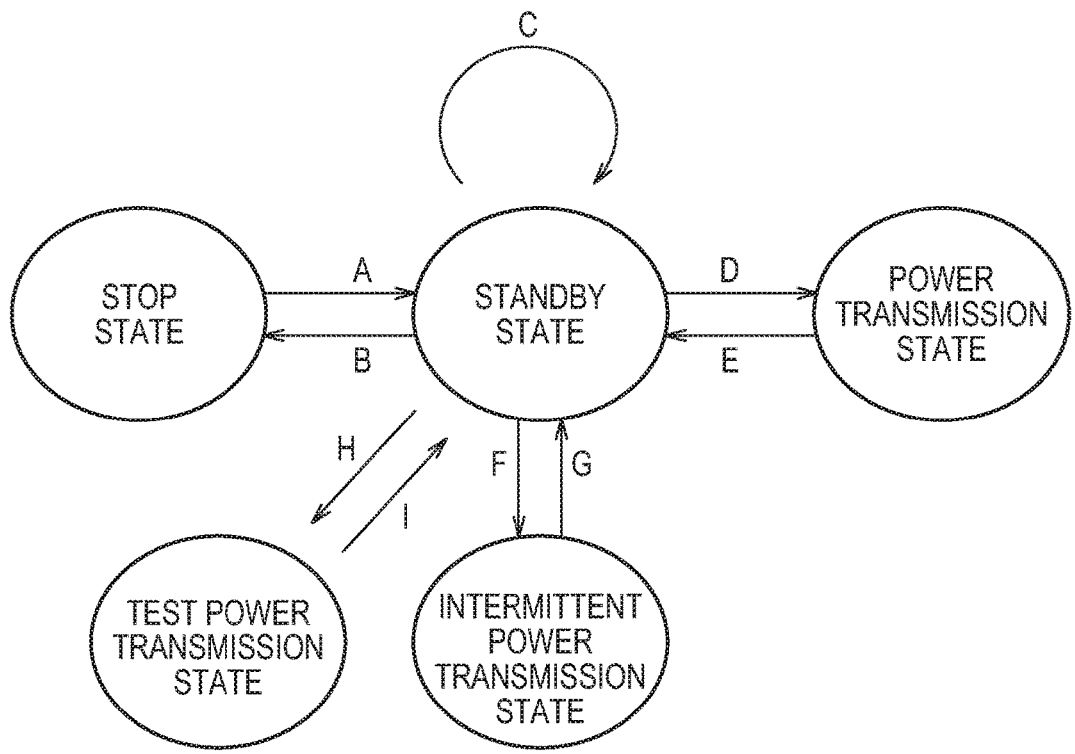
FIG. 4 is a diagram illustrating state transition of the power transmission apparatus 10 according to the first embodiment.
FIG. 5 is a diagram for describing types of the power reception apparatus 20 according to the first embodiment.

In the following, state transition of the power transmission apparatus according to the first embodiment is described. FIG. 4 is a diagram illustrating state transition of the power transmission apparatus 10 according to the first embodiment.

As illustrated in FIG. 4, the state of the power transmission apparatus 10 includes a stop state, a standby state, a power transmission state, an intermittent power transmission state, and a test power transmission state.

The stop state is a state in which power transmission is completely stopped. In detail, the stop state is a state in which the power transmission apparatus 10 is not started.

The standby state is a state in which power is not transmitted, however, power transmission is ready. The standby state is a state in which the power transmission target power reception apparatus 20 is not detected, and a state in which the power supply of the power transmission apparatus 10 is started.

The power transmission state is a state in which power is continuously transmitted to the power transmission target power reception apparatus 20. The power transmission state is, for example, a state in which power is continuously transmitted when only the power transmission target power reception apparatus 20 not having the power storage unit is detected. Here, it should be noted that the power transmission state is a state in which the transmission power of the power transmission apparatus 10 is controlled in a state in which the power transmission target power reception apparatus 20 is detected.

The intermittent power transmission state is a state in which power is intermittently transmitted to the power transmission target power reception apparatus 20. The intermittent power transmission state is, for example, a state in which power is intermittently transmitted when only the power transmission target power reception apparatus 20 having the power storage unit is detected. Incidentally, in FIG. 4, the intermittent power transmission state is defined separately from the power transmission state, however, the intermittent power transmission state can be considered to be a part of the power transmission state. Here, it should be noted that the intermittent power transmission state is a state in which the transmission power of the power transmission apparatus 10 is controlled in a state in which the power transmission target power reception apparatus 20 is detected.

The test power transmission state is a state in which power is transmitted in a state in which the power transmission target power reception apparatus 20 is not detected. In detail, the test power transmission state is a state in which power is transmitted so that a signal (for example, authentication ID described above) can be returned from the power reception apparatus 20 by supplying necessary power for the communication module 23 of the power reception apparatus 20 to communicate. Here, it should be noted that the test power transmission state is a state in which the transmission power of the power transmission apparatus 10 is controlled in a state in which the power transmission target power reception apparatus 20 is not detected.

Incidentally, a power transmission method in the test power transmission state can be different from a power transmission method in the power transmission state and a power transmission method in the intermittent power transmission state. For example, the power transmission method in the test power transmission state is a method repeating a power transmission period in which power is transmitted and a non-power transmission period in which power is not transmitted. It is preferable that the power transmission period in the test power transmission state is longer than the power transmission period in the intermittent power transmission state. Alternatively, the power transmission method in the test power transmission state can be a method for continuously transmitting transmission power smaller than transmission power in the power transmission state and the intermittent power transmission state.

A trigger A for transitioning to the standby state from the stop state is, for example, an event in which the power transmission apparatus 10 is started (event in which power is supplied to the power transmission apparatus 10). A trigger B for transitioning to the stop state from the standby state is, for example, occurrence of an event in which power is disconnected of the power transmission apparatus 10. A trigger C to keep the standby state is occurrence of an event in which the power transmission target power reception apparatus 20 is not detected.

A trigger D for transitioning to the power transmission state from the standby state is occurrence of an event in which the power transmission target power reception apparatus 20 not having the power storage unit is detected. A trigger E for transitioning to the standby state from the power transmission state is occurrence of an event in which all of the power transmission target power reception apparatuses 20 detected are no longer detected. Alternatively, the trigger E is occurrence of an event in which power transmission stop is requested from all of the power transmission target power reception apparatuses 20.

A trigger F for transitioning to the intermittent power transmission state from the standby state is occurrence of an event in which the power transmission target power reception apparatus 20 having the power storage unit is detected. A trigger G for transitioning to the standby state from the intermittent power transmission state is occurrence of an event in which all of the power transmission target power reception apparatuses 20 detected are no longer detected. Alternatively, the trigger G is occurrence of an event in which power transmission stop is requested from all of the power transmission target power reception apparatuses 20.

A trigger H for transitioning to the test power transmission state from the standby state is occurrence of an event in which the state transitions to the standby state from the stop state. That is, the trigger H, same as the trigger A, is occurrence of an event in which the power transmission apparatus 10 is started (event in which power is supplied to the power transmission apparatus 10). That is, when the power transmission apparatus 10 is started from the stop state, it transitions to the standby state, and immediately after that, transitions to the test power transmission state. Incidentally, it can transition directly to the test power transmission state without going through the standby state from the stop state. Alternatively, the trigger H is occurrence of an event in which a state (standby state) continues over a certain period of time in which the power transmission apparatus 10 does not transmit power. Alternatively, the trigger H is user operation. A trigger I for transitioning to the standby state from the test power transmission state is occurrence of an event in which the test power transmission state continues over a certain period of time. Alternatively, the trigger I is occurrence of an event in which a response signal to a search signal (for example, authentication ID, category information) is received from the power reception apparatus 20. In addition, it can transition directly to the power transmission state without going through the standby state from the test state. In addition, the trigger for transitioning to the power transmission state from the test state can be a case where the authentication ID is received from the power reception apparatus 20 and authentication succeeds, or a case where category information is received after authentication succeeds. Here, by "authentication succeeds", it is indicated, for example, that the authentication ID received matches an authentication ID stored in advance.

(Type of Power Reception Apparatus)

In the following, types are described of the power reception apparatus according to the first embodiment. FIG. 5 is a diagram for describing the types of the power reception apparatus 20 according to the first embodiment.

As illustrated in FIG. 5, the power reception apparatus 20 is classified into a plurality of categories (for example, category 1-5). The maximum reception power and the application example are associated with each of the categories.

In this way, by classifying the power reception apparatus 20 into the plurality of categories in advance, the type of the power reception apparatus 20 can be notified only by notifying the category of the power reception apparatus 20 to the power transmission apparatus 10 from the power reception apparatus 20. From this point of view, the information for specifying the type of the power reception apparatus 20 may be information for identifying the category of the power reception apparatus 20 (category information).

It is preferable that the type of the power transmission target power reception apparatus 20, as described above, is identified by information indicating the maximum reception power of the power transmission target power reception apparatus 20, whether or not the power transmission target power reception apparatus 20 has the power storage unit, or capacity of the power storage unit included in the power transmission target power reception apparatus 20. Therefore, it is preferable that the categories are associated with these pieces of information.

Incidentally, when the power transmission apparatus 10 detects the plurality of power reception apparatuses 20, and the maximum reception power calculated from each piece of category information is above the maximum transmission power, power transmission is stopped as an error. Alternatively, even when the power obtained by adding a predetermined value to the maximum reception power is above the maximum transmission power, power transmission can be stopped as an error. Alternatively, power can be transmitted at the maximum transmission power instead of stopping power transmission as an error.

(Power Transmission Method)

Figure 6:
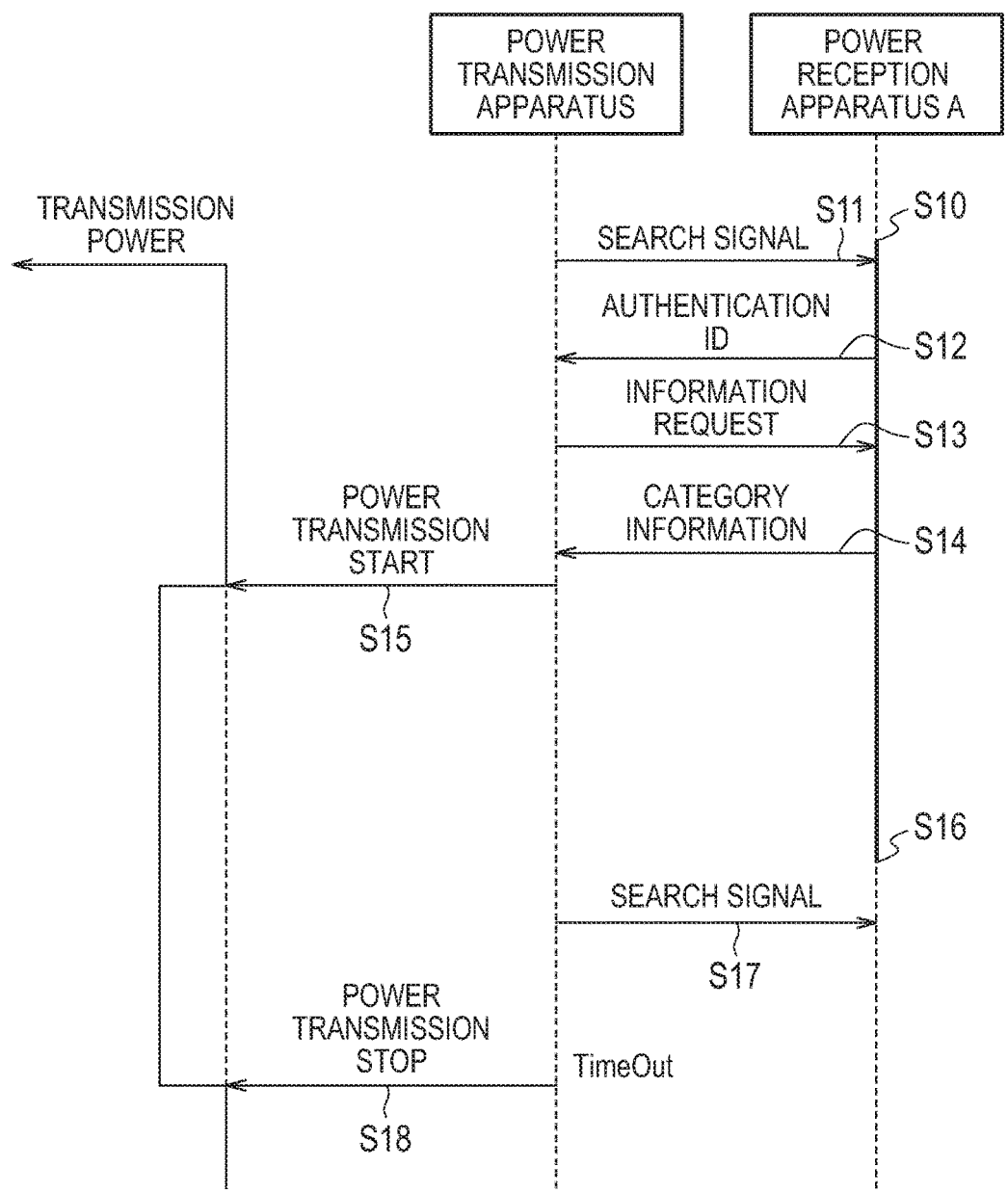
FIG. 6 is a sequence diagram illustrating a power transmission method according to the first embodiment.
Figure 7:
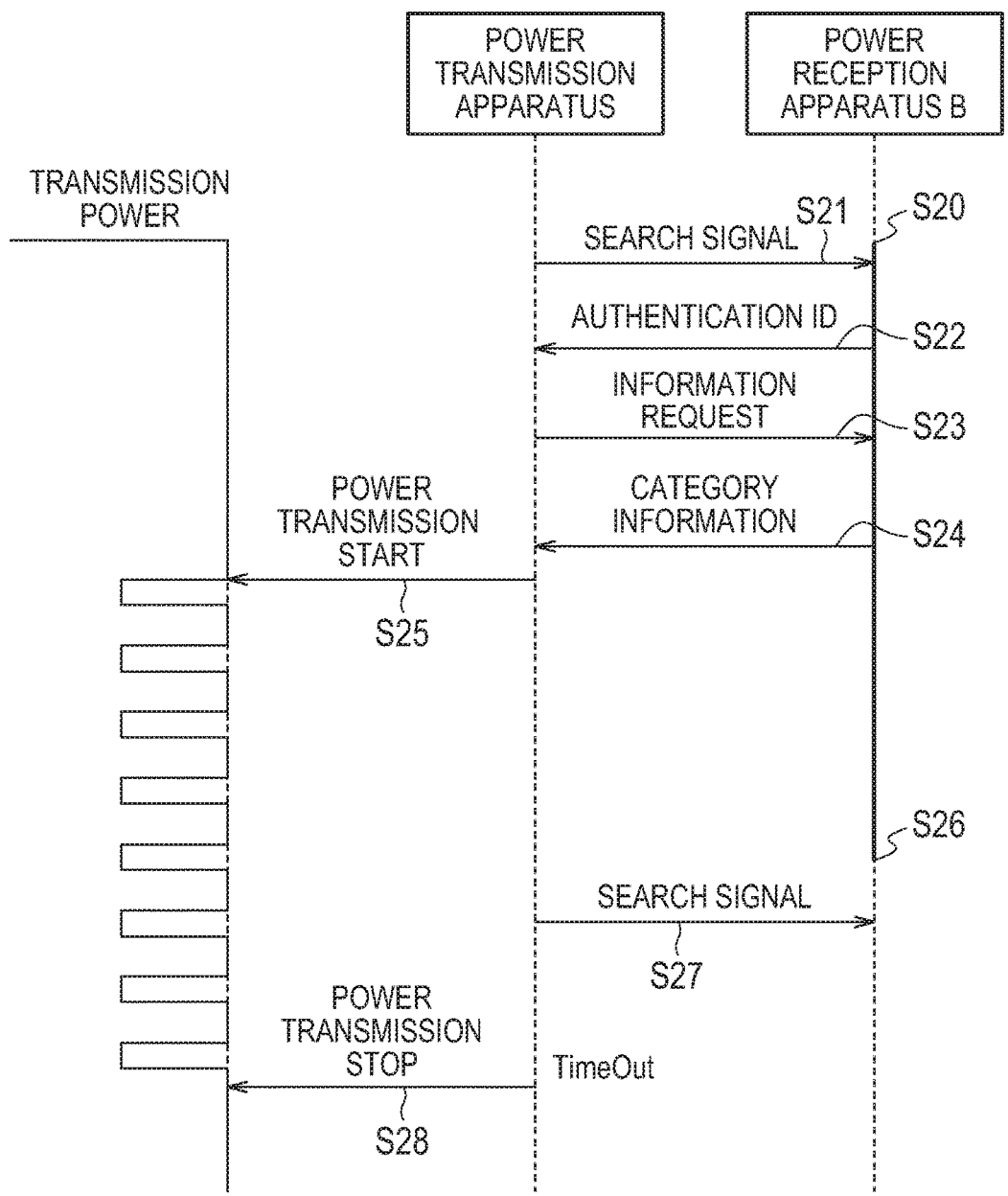
FIG. 7 is a sequence diagram illustrating a power transmission method according to the first embodiment.
Figure 8:
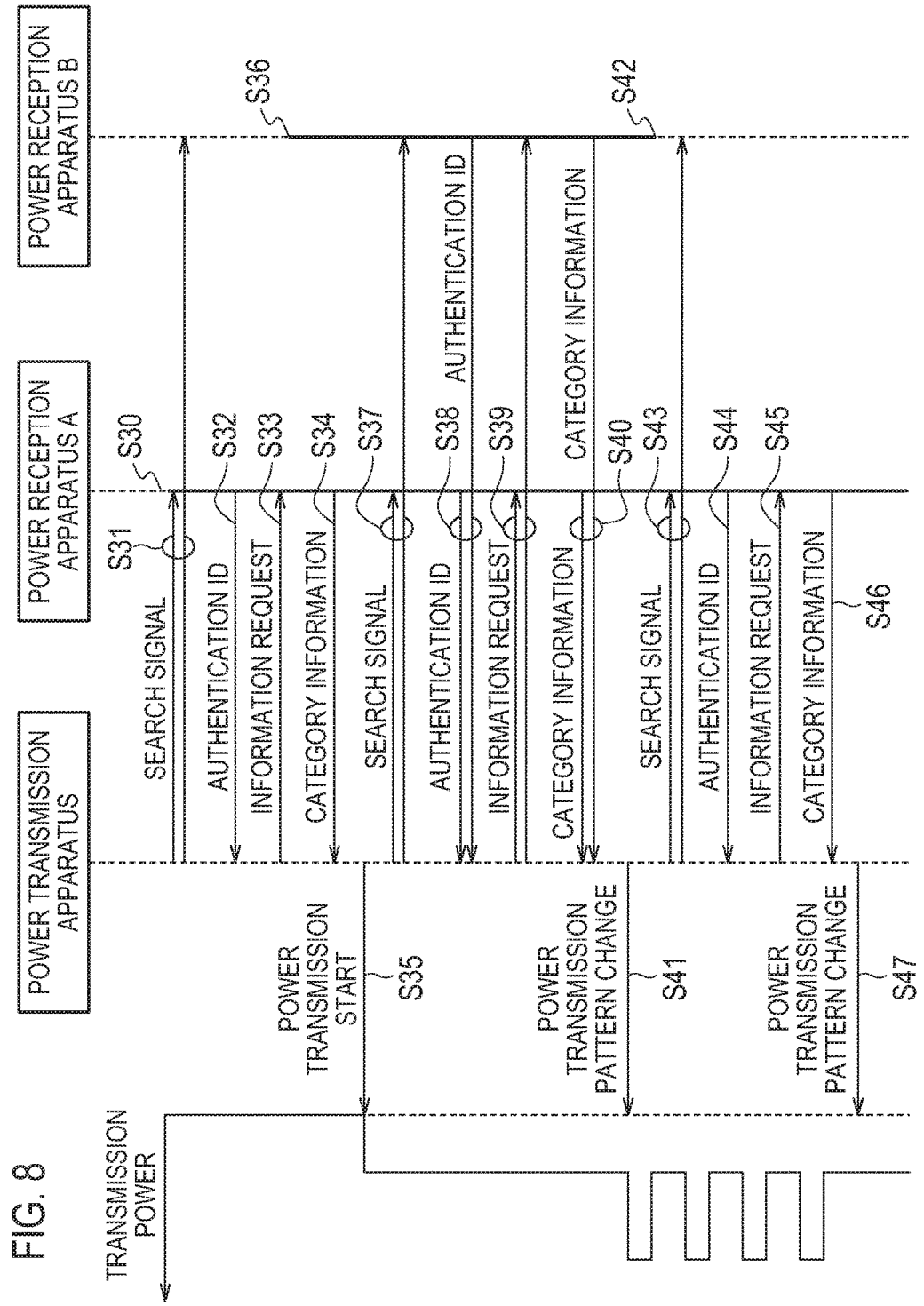
FIG. 8 is a sequence diagram illustrating a power transmission method according to the first embodiment.

In the following, a power transmission method according to the first embodiment is described. FIGS. 6 to 8 are sequence diagrams illustrating the power transmission method according to the first embodiment.

First, a case is described of transmitting power to a power reception apparatus A not having the power storage unit, with reference to FIG. 6. The power reception apparatus A is an example of the power reception apparatus 20.

As illustrated in FIG. 6, in step S10, the power reception apparatus A transitions to a signal reception standby state to start operation of the load 22C. The signal reception standby state is a state in which reception of a signal transmitted from the power transmission apparatus 10 is waited. Here, the power reception apparatus A is required to hold power necessary for communication, and be ready to communicate with the power transmission apparatus 10. For example, it is a state in which the power transmission apparatus 10 is in the test power transmission state, and power necessary for communication is transmitted to the power reception apparatus A, and the power reception apparatus A stores the power transmitted, or a state in which the power reception apparatus A continuously receives the power transmitted.

In step S11, the power transmission apparatus 10 transmits the search signal for searching the power reception apparatus 20. Step S11 is performed in the test power transmission state.

In step S12, the power reception apparatus A transmits an authentication ID of the power reception apparatus A to the power transmission apparatus 10. The power transmission apparatus 10 authenticates the power reception apparatus A as the power transmission target power reception apparatus 20 when an authentication ID stored in advance and the authentication ID received from the power reception apparatus A match with each other.

In step S13, the power transmission apparatus 10 transmits to the power reception apparatus A an information request for requesting transmission of information for specifying a type of the power reception apparatus A.

In step S14, the power reception apparatus A transmits to the power transmission apparatus 10 the information for specifying the type of the power reception apparatus A. For example, the information for specifying the type of the power reception apparatus A is the category information for identifying the category illustrated in FIG. 5.

In step S15, the power transmission apparatus 10 starts power transmission depending on the information (for example, category information) received in step S14. Here, the power transmitted by the power transmission apparatus 10 can be power depending on the information (for example, category information) received in step S14. Here, since it is found that the power reception apparatus A does not have the power storage unit from the information for specifying the type of the power reception apparatus A, the power transmission apparatus 10 controls the power transmission to continuously transmit power. That is, the power transmission apparatus 10 transitions to the power transmission state from the standby state.

In step S16, the power reception apparatus A cancels the signal reception standby state to stop operation of the load 22C.

In step S17, the power transmission apparatus 10 transmits the search signal for searching the power reception apparatus 20. Transmission of the search signal by the power transmission apparatus 10 in step S17, for example, is performed in the power transmission period in which power is transmitted.

In step S18, the power transmission apparatus 10 detects that a certain period of time has elapsed from transmission of the search signal without reply to the search signal. In this case, the power transmission apparatus 10 determines that the power reception apparatus A has stopped receiving power and there is no other power reception apparatus, and stops transmission of the transmission power. That is, power transmission apparatus 10 transitions to the standby state from the power transmission state.

Second, a case is described of transmitting power to a power reception apparatus B having the power storage unit, with reference to FIG. 7. The power reception apparatus B is an example of the power reception apparatus 20.

As illustrated in FIG. 7, in step S20, the power reception apparatus B transitions to the signal reception standby state to start operation of the load 22C. Here, the power reception apparatus B is required to hold power necessary for communication, and be ready to communicate with the power transmission apparatus 10. For example, the power transmission apparatus 10 is in the test power transmission state, and the power necessary for communication is transmitted to the power reception apparatus B. Alternatively, the power necessary for communication can be provided by the power stored in the power storage unit to the power reception apparatus B.

In step S21, the power transmission apparatus 10 transmits the search signal for searching the power reception apparatus 20. In step S21, the power transmission apparatus 10, for example, can be in test power transmission state.

In step S22, the power reception apparatus B transmits an authentication ID of the power reception apparatus B to the power transmission apparatus 10. The power transmission apparatus 10 authenticates the power reception apparatus B as the power transmission target power reception apparatus 20 when an authentication ID stored in advance and the authentication ID received from the power reception apparatus B match with each other. This is regarded that authentication has succeeded.

In step S23, the power transmission apparatus 10 transmits to the power reception apparatus B an information request for requesting transmission of information for specifying a type of the power reception apparatus B.

In step S24, the power reception apparatus B transmits to the power transmission apparatus 10 the information for specifying the type of the power reception apparatus B. For example, the information for specifying the type of the power reception apparatus B is the category information for identifying the category illustrated in FIG. 5.

In step S25, the power transmission apparatus 10 starts power transmission of the power transmission apparatus 10 depending on the information (for example, category information) received in step S24. Here, the power transmitted by the power transmission apparatus 10 can be power depending on the information for specifying the type of the power reception apparatus B received in step S24. Here, since it is found that the power reception apparatus B has the power storage unit from the information for specifying the type of the power reception apparatus B, the power transmission apparatus 10 starts power transmission of the power transmission apparatus 10 to intermittently transmit. That is, the power transmission apparatus 10 transitions to the intermittent power transmission state from the standby state.

In step S26, the power reception apparatus B cancels the signal reception standby state to stop operation of the load 22C.

In step S27, the power transmission apparatus 10 transmits the search signal for searching the power reception apparatus 20. Transmission of the search signal by the power transmission apparatus 10 in step S27, for example, is performed in the power transmission period in which power is transmitted.

In step S28, the power transmission apparatus 10 detects that a certain period of time has elapsed from transmission of the search signal without reply to the search signal. The power transmission apparatus 10 stops power transmission. That is, the power transmission apparatus 10 transitions to the standby state from the intermittent power transmission state.

Third, a case is described of transmitting power to the power reception apparatus A not having the power storage unit and the power reception apparatus B having the power storage unit, with reference to FIG. 8. The power reception apparatus A and the power reception apparatus B are examples of the power reception apparatus 20. The operation illustrated in FIG. 8 is basically a combination of the operation illustrated in FIGS. 6 and 7.

As illustrated in FIG. 8, in step S30, the power reception apparatus A transitions to the signal reception standby state to start operation of the load 22C. Here, the power reception apparatus A is required to hold power necessary for communication, and be ready to communicate with the power transmission apparatus 10. For example, the power transmission apparatus 10 is in the test power transmission state, and power necessary for communication is transmitted to the power reception apparatus A.

In step S31, the power transmission apparatus 10 transmits the search signal for searching the power reception apparatus 20. Transmission of the search signal by the power transmission apparatus 10 in step S31 is performed in the test power transmission state.

In step S32, the power reception apparatus A transmits the authentication ID of the power reception apparatus A to the power transmission apparatus 10. The power transmission apparatus 10 authenticates the power reception apparatus A as the power transmission target power reception apparatus 20 when an authentication ID stored in advance and the authentication ID received from the power reception apparatus A match with each other. On the other hand, the power reception apparatus B does not transmit the authentication ID since it does not transition to the signal reception standby state.

In step S33, the power transmission apparatus 10 transmits to the power reception apparatus A an information request for requesting transmission of information for specifying the type of the power reception apparatus A.

In step S34, the power reception apparatus A transmits to the power transmission apparatus 10 the information for specifying the type of the power reception apparatus A. For example, the information for specifying the type of the power reception apparatus A is the category information for identifying the category illustrated in FIG. 5.

In step S35, the power transmission apparatus 10 starts power transmission of the power transmission apparatus 10 depending on the information (for example, category information) received in step S34. Here, the power transmitted by the power transmission apparatus 10 can be power depending on the information for specifying the type of the power reception apparatus A received in step S34. Here, the power transmission apparatus 10 continuously transmits power to the power reception apparatus A.

In step S36, the power reception apparatus B transitions to the signal reception standby state to start operation of the load 22C. Here, the power reception apparatus B is required to hold power necessary for communication, and be ready to communicate with the power transmission apparatus 10. For example, the power transmission apparatus 10 is in the test power transmission state, and the power necessary for communication is transmitted to the power reception apparatus B. Alternatively, the power necessary for communication can be provided by the power stored in the power storage unit to the power reception apparatus B.

In step S37, the power transmission apparatus 10 transmits the search signal for searching the power reception apparatus 20.

In step S38, the power reception apparatus A transmits the authentication ID of the power reception apparatus A to the power transmission apparatus 10. The power reception apparatus B transmits the authentication ID of the power reception apparatus B to the power transmission apparatus 10.

In step S39, the power transmission apparatus 10 transmits to the power reception apparatus A the information request for requesting transmission of the information for specifying the type of the power reception apparatus A. The power transmission apparatus 10 transmits to the power reception apparatus B the information request for requesting transmission of the information for specifying the type of the power reception apparatus B.

In step S40, the power reception apparatus A transmits to the power transmission apparatus 10 the information for specifying the type of the power reception apparatus A. The power reception apparatus B transmits to the power transmission apparatus 10 the information for specifying the type of the power reception apparatus B. For example, the information for specifying the types of the power reception apparatus A and the power reception apparatus B is the category information for identifying the category illustrated in FIG. 5.

Here, since the power reception apparatus A has already been authenticated, transmission of the information request to the power reception apparatus A in step S39 and transmission of category information from the power reception apparatus A in step S40 can be omitted.

In step S41, the power transmission apparatus 10 controls power transmission of the power transmission apparatus 10 depending on the information (for example, category information) received in step S40. That is, the power transmission apparatus 10 changes a power transmission pattern. Here, the power transmission apparatus 10 changes the power transmission pattern from continuous power transmission at a constant transmission power to alternate repetition of a state in which power is transmitted at transmission power corresponding to the power reception apparatus A and a state in which power is transmitted at transmission power obtained by adding the transmission power corresponding to the power reception apparatus A to transmission power corresponding to the power reception apparatus B. Incidentally, at this time, the power reception apparatus B can be in a resonance state at the timing when the power transmission apparatus 10 transmits power at the transmission power obtained by adding the transmission power corresponding to the power reception apparatus A to the transmission power corresponding to the power reception apparatus B, and can be in a non-resonance state at the timing when the power transmission apparatus transmits power at the transmission power corresponding to the power reception apparatus A.

Thus, the power transmission apparatus 10 is able to appropriately transmit power depending on the case where the power reception apparatus A and the power reception apparatus B exist.

In step S42, the power reception apparatus B cancels the signal reception standby state to stop operation of the load 22C.

In step S43, the power transmission apparatus 10 transmits the search signal for searching the power reception apparatus 20.

In step S44, the power reception apparatus A transmits the authentication ID of the power reception apparatus A to the power transmission apparatus 10. The power transmission apparatus 10 authenticates the power reception apparatus A as the power transmission target power reception apparatus 20 when an authentication ID stored in advance and the authentication ID received from the power reception apparatus A match with each other. On the other hand, the power reception apparatus B does not transmit the authentication ID since it does not transition to the signal reception standby state.

In step S45, the power transmission apparatus 10 transmits to the power reception apparatus A the information request for requesting transmission of the information for specifying the type of the power reception apparatus A.

In step S46, the power reception apparatus A transmits to the power transmission apparatus 10 the information for specifying the type of the power reception apparatus A. For example, the information for specifying the type of the power reception apparatus A is the category information for identifying the category illustrated in FIG. 5.

In step S47, the power transmission apparatus 10 controls power transmission of the power transmission apparatus 10 depending on the information (for example, category information) received in step S46. That is, the power transmission apparatus 10 changes a power transmission pattern. Here, the power transmission apparatus 10 changes the power transmission pattern from a state in which power is transmitted intermittently at the transmission power obtained by adding the transmission power corresponding to the power reception apparatus A to the transmission power corresponding to the power reception apparatus B while power is transmitted continuously at the transmission power corresponding to the power reception apparatus A, to a state in which power is transmitted continuously at the transmission power corresponding to the power reception apparatus A.

(Function and Effect)

In the first embodiment, since power is transmitted to the power reception apparatus 20 by introducing the test power transmission state, the power transmission target power reception apparatus 20 can be detected without depending on a power state of the power reception apparatus 20.

In detail, the power transmission apparatus 10, in the test power transmission state, is able to transmit the search signal for searching the power reception apparatus 20, accordingly the power reception apparatus 20 is able to receive the search signal, and is able to transmit the authentication ID depending on the search signal. Thus, the power transmission apparatus 10, based on the authentication ID, is able to authenticate the power reception apparatus 20, and is able to detect the power transmission target power reception apparatus 20.

[Summary of Second Embodiment]

It is considered that a power transmission apparatus does not grasp a power reception apparatus existing around the power transmission apparatus. Alternatively, it is considered that the power transmission apparatus does not grasp a power reception state of the power reception apparatus even when grasping the power reception apparatus existing around the power transmission apparatus.

In such a case, it is considered that power may not be appropriately transmitted to the power reception apparatus even if the power transmission apparatus continues to transmit power to the power reception apparatus. For example, even if power is transmitted to the power reception apparatus when the power reception apparatus does not exist around the power transmission apparatus, power transmission of the power transmission apparatus is wasted. Alternatively, even if power is transmitted to the power reception apparatus when the power reception apparatus is in a state in which the power cannot be received, power transmission of the power transmission apparatus is wasted.

On the other hand, a control apparatus according to a second embodiment is used in a power transmission system for transmitting power with a magnetic resonance manner to a power reception apparatus from a power transmission apparatus. The control apparatus comprises a power control unit configured to control a power transmission state in which power transmission of the power transmission apparatus is controlled in a state in which a power transmission target power reception apparatus is detected, and a standby state in which the transmission of transmission power of the power transmission apparatus is waited in a state in which the power transmission to the power transmission target power reception apparatus is ready.

In the second embodiment, the power control unit transitions to the standby state from the power transmission state depending on the predetermined trigger. That is, power can be appropriately transmitted to the power reception apparatus by introduction of the standby state.

[Second Embodiment]

In the following, the second embodiment is described. A difference from the first embodiment is mainly described below.

Specifically, in the first embodiment, the control unit 13B configures the power control unit configured to control the power transmission state (power transmission state and intermittent power transmission state described later) in which the transmission power of the power transmission apparatus 10 is controlled in a state in which the power transmission target power reception apparatus 20 is detected, and the test power transmission state in which the transmission power of the power transmission apparatus 10 is controlled in a state in which the power transmission target power reception apparatus 20 is not detected.

On the other hand, in the second embodiment, the control unit 13B configures a power control unit configured to control the transmission power of the power transmission apparatus 10, based on at least one of the number of power transmission target power reception apparatuses 20 and a type of the power transmission target power reception apparatus 20.

(Transition to Standby State from Power Transmission State)

In the following, detail is described of transition to the standby state from the power transmission state. As described above, the transitions trigger E for transitioning to the standby state from the power transmission state is occurrence of an event in which all of the power transmission target power reception apparatuses 20 detected are no longer detected. As a method for detecting the power transmission target power reception apparatus 20, for example, a method described below is considered.

First, the trigger E is occurrence of an event in which a response signal to a search signal (for example, authentication ID) cannot be received within a certain period of time from transmission of the search signal. Incidentally, it should be noted that the transmission of the search signal is periodically performed.

Second, the power transmission target power reception apparatus 20 is a power reception apparatus 20 authenticated, and an authentication period of the power reception apparatus 20 expires when a certain period of time has elapsed after authentication processing of the power reception apparatus 20 is performed. That is, the trigger E is occurrence of an event in which all of the authentication periods of the power reception apparatus 20 expire. Incidentally, it should be noted that the authentication processing of the power reception apparatus 20 is periodically performed.

Figure 9:
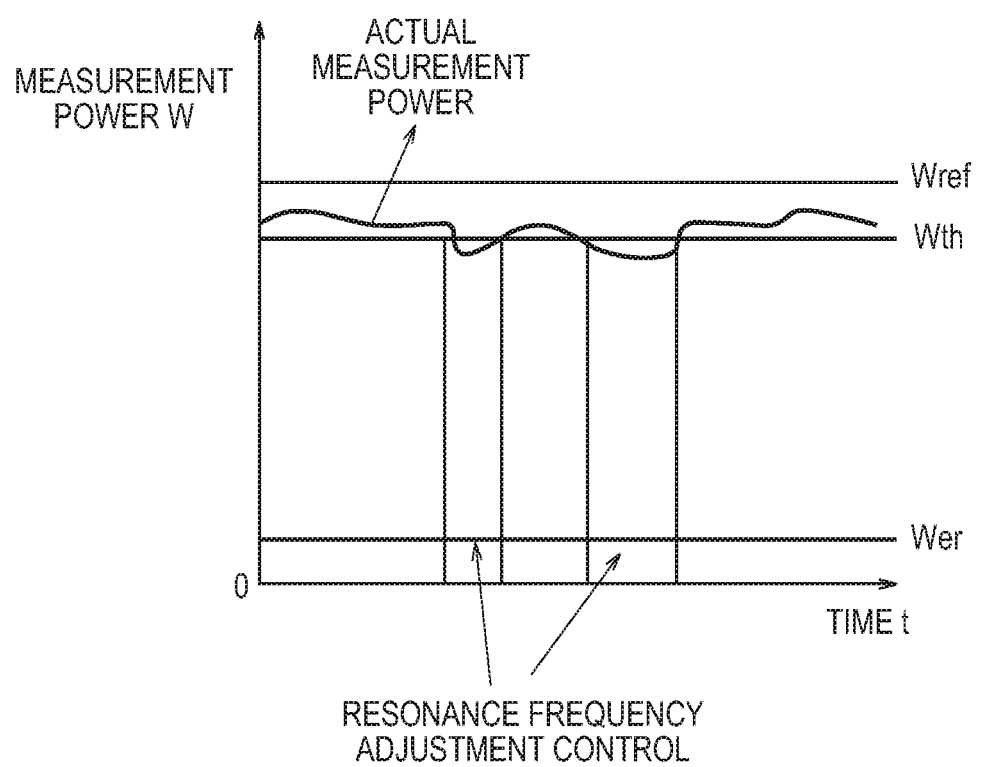
FIG. 9 is a diagram for describing a trigger E according to a second embodiment.

Third, the control unit 13B described above controls the transmission power of the power transmission apparatus 10 to transmit power at reference power (Wref) in the power transmission state as illustrated in FIG. 9. The trigger E is occurrence of an event in which the transmission power of the power transmission apparatus 10 is below a stop threshold value (Wer) smaller than the reference power (Wref). In such a case, it should be noted that the power transmission apparatus 10 periodically measures the transmission power of the power transmission apparatus 10 in the power transmission state.

Here, the reference power (Wref) is acquired by measuring in advance the transmission power of the power transmission apparatus 10 in a state in which the power transmission target power reception apparatus 20 does not exist. It is preferable that the reference power (Wref) is associated with in advance at least one of the number of power transmission target power reception apparatuses 20 and the type of the power transmission target power reception apparatus 20. However, the reference power (Wref) can be a fixed value. The stop threshold value (Wer) is, for example, 10% of the reference power (Wref).

Fourth, the control unit 13B described above controls the transmission power of the power transmission apparatus 10 to transmit power at the reference power (Wref) in the power transmission state as illustrated in FIG. 9. The control unit 13B adjusts a resonance frequency of the power transmission apparatus 10 when the transmission power of the power transmission apparatus 10 is below an adjustment threshold value (Wth) smaller than the reference power (Wref) in the power transmission state. For example, the control unit 13B adjusts the resonance frequency of the power transmission side resonator 11 so that the transmission power of the power transmission apparatus 10 is above the adjustment threshold value (Wth), by adjusting capacity of the capacitor C. The trigger E is occurrence of an event in which the transmission power of the power transmission apparatus 10 is below the stop threshold value (Wer) smaller than the adjustment threshold value (Wth). In such a case, it should be noted that the power transmission apparatus 10 periodically measures the transmission power of the power transmission apparatus 10 in the power transmission state. The adjustment threshold value (Wth) is, for example, 90% of the reference power (Wref).

(Function and Effect)

In the second embodiment, the control unit 13B transitions to the standby state from the power transmission state depending on the predetermined trigger (trigger E described above). That is, power can be appropriately transmitted to the power reception apparatus by transitioning to the standby state by an appropriate trigger.

[Summary of Third Embodiment]

It is considered that a power transmission apparatus does not grasp a power reception apparatus existing around the power transmission apparatus. Alternatively, it is considered that the power transmission apparatus does not grasp the power reception apparatus operating even when grasping the power reception apparatus existing around the power transmission apparatus. Alternatively, it is considered that the power transmission apparatus does not grasp the power reception apparatus newly installed.

Therefore, it is preferable that the power transmission apparatus transmits a search signal for searching a power transmission target power reception apparatus, and detects the power transmission target power reception apparatus by information transmitted from the power reception apparatus.

However, when the power reception apparatus does not have a power storage unit such as a capacitor and a secondary battery, the power reception apparatus is not able to transmit the information if the power is not transmitted from the power transmission apparatus. In addition, when the power stored in the power storage unit is not able to provide power necessary for communication even if the power reception apparatus has the power storage unit such as the capacitor and the secondary battery, the power reception apparatus is not able to transmit the information if the power is not transmitted from the power transmission apparatus.

In this way, due to power shortage of the power reception apparatus, there is a case where the power reception apparatus is not able to communicate, and the power transmission target power reception apparatus may not be detected.

On the other hand, a control apparatus according to a third embodiment is used in a power transmission system for transmitting power with a magnetic resonance manner to a power reception apparatus from a power transmission apparatus. The control apparatus comprises a power control unit configured to control a standby state in which the power transmission of the power transmission apparatus is waited in a state in which power transmission to a power transmission target power reception apparatus is ready, and a search power transmission state in which the power transmission apparatus intermittently transmits power in a state in which the power transmission target power reception apparatus is not detected. The power control unit transitions to the search power transmission state from the standby state depending on a predetermined trigger.

In the third embodiment, the power transmission target power reception apparatus can be detected without depending on a power state of the power reception apparatus since the power is transmitted to the power reception apparatus by introducing the search power transmission state.

[Third Embodiment]

In the following, the third embodiment is described. A difference from the first embodiment is mainly described below.

Specifically, in the first embodiment, the control unit 13B configures the power control unit configured to control the power transmission state (power transmission state and intermittent power transmission state described later) in which the transmission power of the power transmission apparatus 10 is controlled in a state in which the power transmission target power reception apparatus 20 is detected, and the test power transmission state in which the transmission power of the power transmission apparatus 10 is controlled in a state in which the power transmission target power reception apparatus 20 is not detected.

On the other hand, in the third embodiment, the control unit 13B configures a power control unit configured to control the transmission power of the power transmission apparatus 10, based on at least one of the number of power transmission target power reception apparatuses 20 and a type of the power transmission target power reception apparatus 20.

(State Transition of Power Transmission Apparatus)

Figure 10:
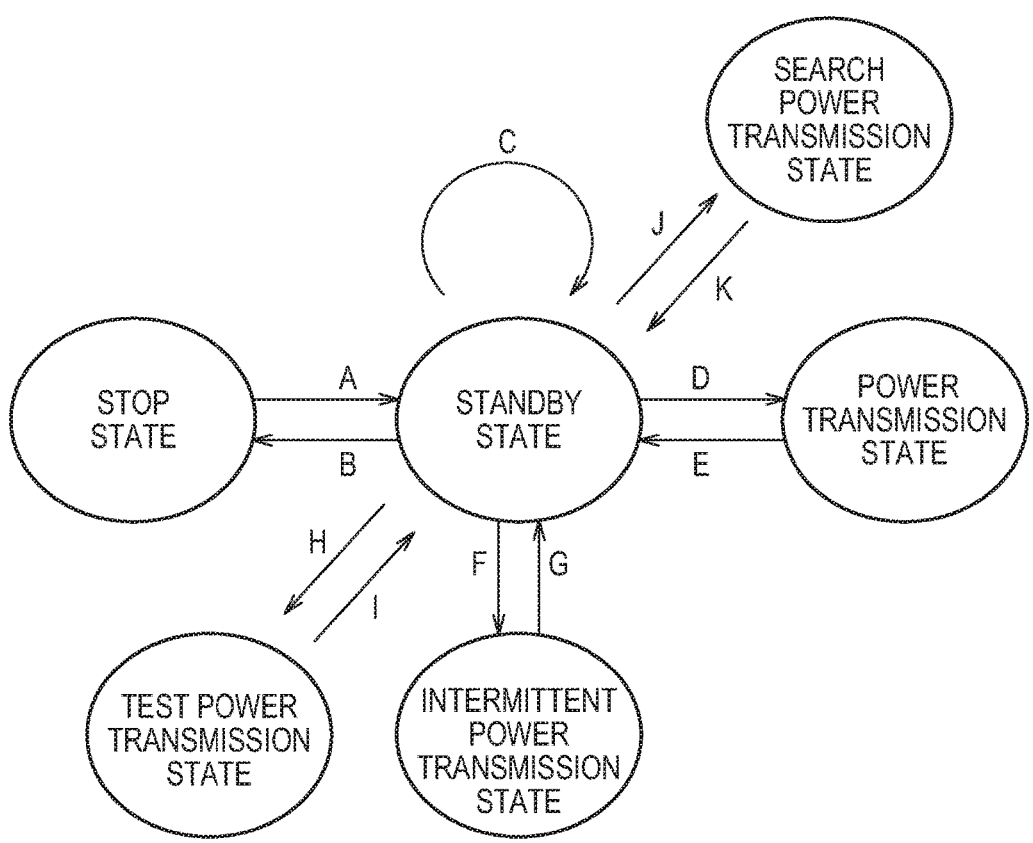
FIG. 10 is a diagram illustrating state transition of the power transmission apparatus 10 according to a third embodiment.

In the following, state transition is described of the power transmission apparatus according to the third embodiment. FIG. 10 is a diagram illustrating the state transition of a power transmission apparatus 10 according to the third embodiment.

As illustrated in FIG. 10, the state of the power transmission apparatus 10 includes a search power transmission state in addition to the states illustrated in FIG. 4 (stop state, standby state, power transmission state, intermittent power transmission state, test power transmission state).

The search power transmission state is a state in which power is transmitted in a state in which a power transmission target power reception apparatus 20 is not detected. In detail, the search power transmission state is a state in which transmission power is transmitted so that a signal (for example, authentication ID described above) can be returned from the power reception apparatus 20 by supplying necessary power for the communication module 23 of the power reception apparatus 20 to communicate. Incidentally, the power transmission apparatus 10 can transmit the search signal for searching the power reception apparatus 20 via a communication unit 13A in the search power transmission state. In addition, the power reception apparatus 20 can start transmission of the search signal when a predetermined time has elapsed after transitioning to the search power transmission state and starting power transmission.

Incidentally, a power transmission method in the search power transmission state can be different from a power transmission method in the power transmission state, a power transmission method in the intermittent power transmission state. For example, the power transmission method in the search power transmission state is a method repeating a power transmission period in which power is transmitted and a non-power transmission period in which power is not transmitted, same as of the test power transmission state. It is preferable that the power transmission period in the search power transmission state is longer than the power transmission period in the intermittent power transmission state.

In the third embodiment, it is preferable that an intermittent period is longer in which power is transmitted by the power transmission apparatus 10 (that is, the length of the interval of the power transmission period or the interval of the non-power transmission period adjacent to each other in terms of time) in the search power transmission state, as the time is longer in which a state continues in which the power transmission target power reception apparatus 20 is not detected. Alternatively, the power transmission period in the search power transmission state can be changed depending on the time in which the state continues in which the power transmission target power reception apparatus 20 is not detected.

In the third embodiment, the control unit 13B controls the transmission power of the power transmission apparatus 10 to transmit power at reference power (Wref) when being in the power transmission state. In such a premise, it is preferable that the control unit 13B controls the transmission power of the power transmission apparatus 10 to transmit at power smaller than the reference power (for example, power of 40% of the reference power (Wref)) in the search power transmission state. Alternatively, the control unit 13B, in the search power transmission state, can control the transmission power of the power transmission apparatus 10 to transmit power at the reference power (Wref) used in a power transmission state immediately before transitioning to the search power transmission state. Here, the reference power (Wref) can be maximum transmission power of the power transmission apparatus 10. The maximum transmission power is maximum power that can be transmitted by the power transmission apparatus 10.

A trigger J for transitioning to the search power transmission state from the standby state is occurrence of an event in which the standby state continues over a certain period of time. A trigger K for transitioning to the standby state from the search power transmission state is occurrence of an event in which the search power transmission state continues over a certain period of time. Alternatively, the trigger K is occurrence of an event in which a response signal to a search signal (for example, authentication ID, and category information) is received from the power reception apparatus 20. Incidentally, the power transmission apparatus 10 can start transmission of the search signal for searching the power reception apparatus 20 when transitioning to the search power transmission state from the standby state, and can stop transmission of the search signal when transitioning to the standby state from the search power transmission state.

Incidentally, in the above description, although it is supposed that the search power transmission state is a different state from the standby state and the test power transmission state, not limited thereto, for example, it can be supposed that the search power transmission state is included in the standby state or the test power transmission state as one aspect of each of the states.

(Function and Effect)

In the third embodiment, the power transmission target power reception apparatus 20 can be detected without depending on a power state of the power reception apparatus 20 since the power is transmitted to the power reception apparatus 20 by introducing the search power transmission state.

[Summary of Fourth Embodiment]

As a utilizing scene of a magnetic resonance manner, a utilizing scene is considered in which power is wirelessly transmitted to a plurality of power reception apparatuses from one power transmission apparatus.

However, in the technique described above, it is only considered to achieve energy saving by gradually decreasing transmission power of a power transmission apparatus when a power increase request is not received from a power reception apparatus.

Therefore, in the utilizing scene in which power is wirelessly transmitted to a plurality of power reception apparatuses from one power transmission apparatus, there is room for various improvements to appropriately control the transmission power of the power transmission apparatus.

On the other hand, a control apparatus according to a fourth embodiment is used in a power transmission system for transmitting power with a magnetic resonance manner to a power reception apparatus from a power transmission apparatus. The control apparatus comprises a power control unit configured to configured to control transmission power of the power transmission apparatus, based on at least one of the number of power transmission target power reception apparatuses, and a type of the power transmission target power reception apparatus. The power transmission target power reception apparatus is a power reception apparatus authenticated by the control apparatus.

In the fourth embodiment, the power control unit controls the transmission power of the power transmission apparatus, based on at least one of the number of power transmission target power reception apparatuses and the type of the power transmission target power reception apparatus. Therefore, in the utilizing scene in which power is wirelessly transmitted to a plurality of power reception apparatus from one power transmission apparatus, the transmission power of the power transmission apparatus can be appropriately controlled.

[Fourth Embodiment]

In the following, the fourth embodiment is described. A difference from the first embodiment is mainly described below.

Specifically, in the first embodiment, the control unit 13B configures the power control unit configured to control the power transmission state (power transmission state and intermittent power transmission state described later) in which the transmission power of the power transmission apparatus 10 is controlled in a state in which the power transmission target power reception apparatus 20 is detected, and the test power transmission state in which the transmission power of the power transmission apparatus 10 is controlled in a state in which the power transmission target power reception apparatus 20 is not detected.

On the other hand, in the fourth embodiment, the control unit 13B configures a power control unit configured to control the transmission power of the power transmission apparatus 10, based on at least one of the number of power transmission target power reception apparatuses 20 and the type of the power transmission target power reception apparatus 20.

(Function and Effect)

In the fourth embodiment, the control unit 13B of the power transmission apparatus 10 controls the transmission power of the power transmission apparatus 10 based on at least one of the number of power transmission target power reception apparatuses 20 and the type of the power transmission target power reception apparatus 20. Therefore, in the utilizing scene in which power is wirelessly transmitted to a plurality of power reception apparatuses 20 from one power transmission apparatus 10, the transmission power of the power transmission apparatus 10 can be appropriately controlled.

[Modification]

In the following, a modification of the fourth embodiment is described. A difference from the fourth embodiment is mainly described below.

Although it is not particularly mentioned in the fourth embodiment, in the modification, the power reception apparatus 20 has a function of transmitting to the power transmission apparatus 10 a start request for requesting start of power transmission and a stop request for requesting stop of the power transmission.

(Power Transmission Method)

Figure 11:
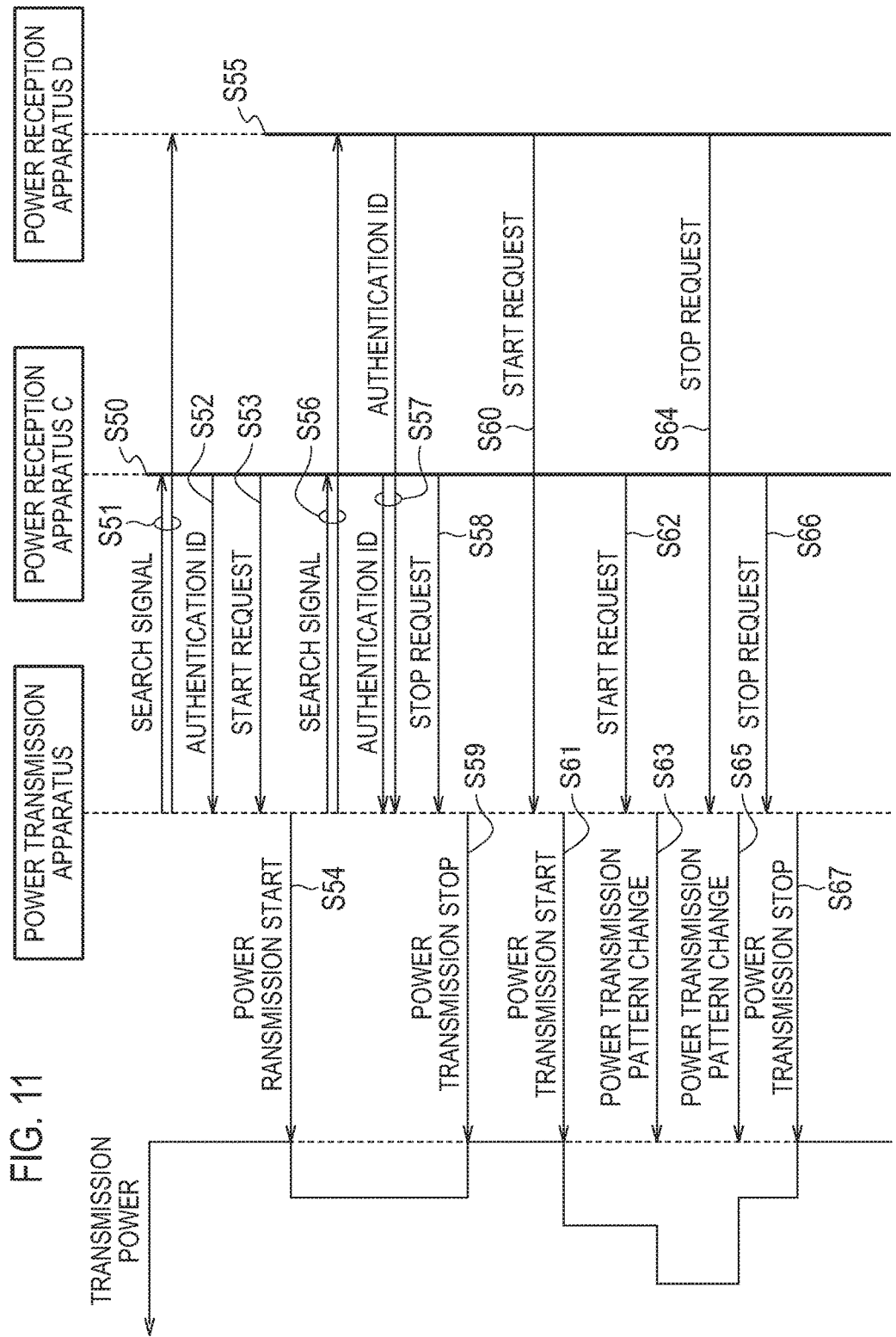
FIG. 11 is a sequence diagram illustrating a power transmission method according to a modification of a fourth embodiment.

In the following, a power transmission method according to the modification is described. FIG. 11 is a sequence diagram illustrating the power transmission method according to the modification. Here, a case is exemplified of transmitting power to a power reception apparatus C and a power reception apparatus D each having a power storage unit. In addition, a case is exemplified of transmitting continuous power also to the power reception apparatus having the power storage unit, instead of transmitting intermittent power.

As illustrated in FIG. 11, in step S50, the power reception apparatus C transitions to a signal reception standby state to start operation of a load 22C. Here, power necessary for communication is provided by power stored in the power storage unit to the power reception apparatus C.

In step S51, the power transmission apparatus 10 transmits the search signal for searching the power reception apparatus 20.

In step S52, the power reception apparatus C transmits an authentication ID of the power reception apparatus C to the power transmission apparatus 10. The power transmission apparatus 10 authenticates the power reception apparatus C as the power transmission target power reception apparatus 20 when an authentication ID stored in advance and the authentication ID received from the power reception apparatus C match with each other. On the other hand, the power reception apparatus D does not transmit the authentication ID since it does not transition to the standby state.

In step S53, the power reception apparatus C transmits to the power transmission apparatus 10 the start request for requesting start of power transmission. It is preferable that the start request includes information indicating reception power desired by the power reception apparatus C.

In step S54, the power transmission apparatus 10 starts the power transmission to the power reception apparatus C depending on the start request received from the power reception apparatus C.

In step S55, the power reception apparatus D transitions to the standby state to start operation of the load 22C. Here, power necessary for communication is provided by power stored in the power storage unit to the power reception apparatus D.

In step S56, the power transmission apparatus 10 transmits the search signal for searching the power reception apparatus 20.

In step S57, the power reception apparatus C transmits the authentication ID of the power reception apparatus C to the power transmission apparatus 10. The power reception apparatus D transmits the authentication ID of the power reception apparatus D to the power transmission apparatus 10.

In step S58, the power reception apparatus C transmits to the power transmission apparatus 10 a stop request for requesting stop of the power transmission.

In step S59, the power transmission apparatus 10 stops the power transmission to the power reception apparatus C depending on the stop request received from the power reception apparatus C.

In step S60, the power reception apparatus D transmits to the power transmission apparatus 10 a start request for requesting start of power transmission. It is preferable that the start request includes information indicating reception power desired by the power reception apparatus D.

In step S61, the power transmission apparatus 10 starts the power transmission to the power reception apparatus D depending on the start request received from the power reception apparatus D.

In step S62, the power reception apparatus C transmits to the power transmission apparatus 10 a start request for requesting start of power transmission. It is preferable that the start request includes information indicating reception power desired by the power reception apparatus C.

In step S63, the power transmission apparatus 10 starts the power transmission to the power reception apparatus C in addition to the power transmission to the power reception apparatus D depending on the start request received from the power reception apparatus C. That is, the power transmission apparatus 10 transmits power at power obtained by adding power corresponding to the power reception apparatus C to power corresponding to the power reception apparatus D.

In step S64, the power reception apparatus D transmits to the power transmission apparatus 10 a stop request for requesting stop of the power transmission.

In step S65, the power transmission apparatus 10 stops the power transmission to the power reception apparatus D depending on the stop request received from the power reception apparatus D. However, the power transmission apparatus 10 continues the power transmission to the power reception apparatus C.

In step S66, the power reception apparatus C transmits to the power transmission apparatus 10 a stop request for requesting stop of the power transmission.

In step S67, the power transmission apparatus 10 stops the power transmission to the power reception apparatus C depending on the stop request received from the power reception apparatus C.

Subsequently, timing is described when the power reception apparatus 20 generates the power transmission start request and the power transmission stop request with reference to FIG. 12.

Figure 12:
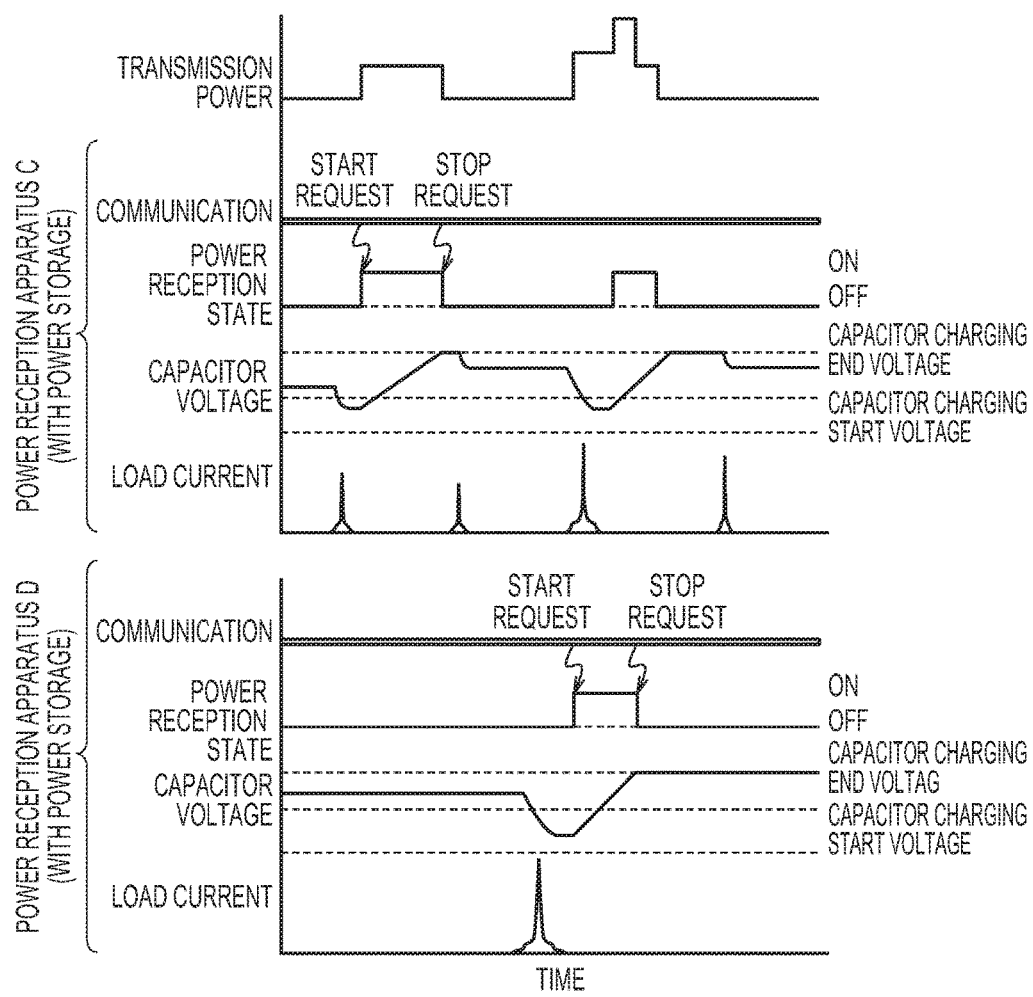
FIG. 12 is a diagram for describing a power transmission method according to the modification of the fourth embodiment.

As illustrated in FIG. 12, the power reception apparatus 20 monitors power stored in a power storage unit 22D. The power reception apparatus 20 transmits to the power transmission apparatus 10 a start request for requesting start of power transmission when the power stored in the power storage unit 22D is below a first threshold value. On the other hand, the power reception apparatus 20 transmits to the power transmission apparatus 10 a stop request for requesting stop of the power transmission when the power stored in the power storage unit 22D is above a second threshold value.

Here, the first threshold value is a threshold value at which charging of the power storage unit 22D should be started. When the power storage unit 22D is an electric double layer capacitor, the first threshold value is a capacitor charging start voltage. The second threshold value is a threshold value at which the charging of the power storage unit 22D should be completed, and is greater than the first threshold value. When the power storage unit 22D is an electric double layer capacitor, the second threshold value is a capacitor charging end voltage.

Here, it is preferable that the power reception apparatus 20 transitions to a resonance state from a non-resonance state when the power stored in the power storage unit 22D is below the first threshold value (for example, capacitor charging start voltage). It is preferable that the power reception apparatus 20 transitions to the non-resonance state from the resonance state when the power stored in the power storage unit 22D is above the second threshold value (for example, capacitor charging end voltage). The resonance state is a state in which it is possible to resonate with a magnetic field generated from the power transmission apparatus 10, and the non-resonance state is a state in which it is impossible to resonate with the magnetic field generated from the power transmission apparatus 10.

[Summary of Fifth Embodiment]

In a magnetic resonance manner, when a resonator of a power transmission apparatus and a resonator of a power reception apparatus resonate with each other, even if power feeding to the power reception apparatus is not necessary, power is transmitted to the power reception apparatus from the power transmission apparatus. That is, it is not possible to arbitrarily switch whether or not the power reception apparatus receives transmitted power.

On the other hand, a control apparatus according to a fifth embodiment is used in a power transmission system for transmitting power with a magnetic resonance manner to a power reception apparatus from a power transmission apparatus. The control apparatus comprises a resonance control unit configured to control a state of a resonator of the power reception apparatus between a resonance state in which the resonator of the power reception apparatus is capable of resonating with a magnetic field generated from the power transmission apparatus and a non-resonance state in which the resonator of the power reception apparatus does not resonate with the magnetic field generated from the power transmission apparatus.

In the fifth embodiment, it is possible to arbitrarily switch whether or not the power reception apparatus receives the transmitted power, by introduction of the resonance state and the non-resonance state.

[Fifth Embodiment]

In the following, the fifth embodiment is described. A difference from the first embodiment is mainly described below.

Specifically, in the first embodiment, the control unit 13B configures the power control unit configured to control the power transmission state (power transmission state and intermittent power transmission state described later) in which the transmission power of the power transmission apparatus 10 is controlled in a state in which the power transmission target power reception apparatus 20 is detected, and the test power transmission state in which the transmission power of the power transmission apparatus 10 is controlled in a state in which the power transmission target power reception apparatus 20 is not detected.

On the other hand, in the fifth embodiment, the control unit 13B controls the transmission power of the power transmission apparatus 10 based on at least one of the number of power transmission target power reception apparatuses 20 and a type of the power transmission target power reception apparatus 20.

In addition, in the fifth embodiment, a control unit 23B configures a resonance control unit configured to control a state of a power reception side resonator 21 between a resonance state in which a resonance frequency of the resonator of the power reception apparatus 20 matches a resonance frequency of the resonator of the power transmission apparatus 10, and a non-resonance state in which the resonance frequency of the resonator of the power reception apparatus 20 does not match the resonance frequency of the resonator of the power transmission apparatus 10. In other words, the resonance state is a state in which it is possible to resonate with a magnetic field generated from the power transmission apparatus 10, and the non-resonance state is a state in which it is impossible to resonate with the magnetic field generated from power transmission apparatus 10. When the resonator of the power reception apparatus 20 is in the resonance state, the power reception apparatus 20 is able to receive power supplied from the power transmission apparatus 10 due to the fact that the resonator of the power reception apparatus 20 resonates with the magnetic field generated from the resonator of the power transmission apparatus 10. On the other hand, when the resonator of the power reception apparatus 20 is in the non-resonance state, the power reception apparatus 20 is not able to receive the power supplied from the power transmission apparatus 10 since the resonator of the power reception apparatus 20 does not resonate with the magnetic field generated from the resonator of the power transmission apparatus 10. For example, the control unit 23B adjusts the resonance frequency of the power reception side resonator 21 by adjusting capacity of a capacitor C to control the state of the power reception side resonator 21 between the resonance state and the non-resonance state.

First, the control unit 23B can make the state of the power reception side resonator 21 transition to the non-resonance state from the resonance state depending on user operation. Similarly, the control unit 23B can make the state of the power reception side resonator 21 transition to the resonance state from the non-resonance state depending on the user operation.

Second, the control unit 23B can control the resonance state of the power reception side resonator 21 depending on an instruction received from an EMS. In such a case, the EMS manages the power reception state of a plurality of power reception apparatuses 20, and instructs state transition of the resonator of a first power reception apparatus depending on a power reception state of a second power reception apparatus. For example, the EMS instructs the first power reception apparatus to transition to the non-resonance state from the resonance state when reception power of the second power reception apparatus is below a predetermined threshold value. Incidentally, not limited to the EMS, it can be the other control apparatus.

Third, when the control unit 23B is provided to the first power reception apparatus, the control unit 23B can control the state of the resonator of the first power reception apparatus depending on the power reception state of the second power reception apparatus. For example, the control unit 23B makes the state of the power reception side resonator 21 transition to the non-resonance state from the resonance state, in the first power reception apparatus, when the reception power of the second power reception apparatus is below the predetermined threshold value. Incidentally, the control unit 23B can be configured separately from the first power reception apparatus.

Fourth, the control unit 23B can control the state of the resonator of the power reception apparatus 20 depending on an amount of power stored in the power storage unit 22D. For example, the control unit 23B makes the state of the power reception side resonator 21 transition to the resonance state from the non-resonance state when the amount of power stored in the power storage unit 22D is below the predetermined threshold value.

(Power Transmission Method)

In the following, a power transmission method according to the fifth embodiment is described. It should be noted that, in the fifth embodiment, the operation is the same as described above with reference to FIGS. 6 to 8, except for the followings.

It should be noted that, specifically, in step S10 of FIG. 6, a power reception apparatus A transitions to the resonance state from the non-resonance state when the current state is the non-resonance state.

It should be noted that, in step S20 of FIG. 7, a power reception apparatus B transitions to the resonance state from the non-resonance state when the current state is the non-resonance state.

In step S26 of FIG. 7, the power reception apparatus B can transition to the non-resonance state from the resonance state.

It should be noted that, in step S30 of FIG. 8, the power reception apparatus A transitions to the resonance state from the non-resonance state when the current state is the non-resonance state.

It should be noted that, in step S36 of FIG. 8, the power reception apparatus B transitions to the resonance state from the non-resonance state when the current state is the non-resonance state.

In step S42 in FIG. 8, the power reception apparatus B cancels a signal reception standby state to stop operation of a load 22C. The power reception apparatus B can transition to the non-resonance state from the resonance state.

(Function and Effect)

In the fifth embodiment, it is possible to arbitrarily switch whether or not the power reception apparatus 20 receives the transmitted power, by introduction of the resonance state and the non-resonance state.

[Summary of Sixth Embodiment]

It is considered that reception power of a power reception apparatus is insufficient in a case where the number of power reception apparatuses increases or a case where power consumption of the power reception apparatus varies, even when transmission power of a power transmission apparatus is kept constant. On the other hand, when the transmission power of the power transmission apparatus is always set to maximum power, the transmission power of the power transmission apparatus becomes excessive, and the transmission power of the power transmission apparatus is wasted. Further, although it is considered that the transmission power of the power transmission apparatus is controlled individually depending on a request of the power reception apparatus, control of the transmission power of the power transmission apparatus becomes complicated.

On the other hand, a control apparatus according to a sixth embodiment is used in a power transmission system for transmitting power with a magnetic resonance manner to a power reception apparatus from a power transmission apparatus. The control apparatus comprises a power control unit configured to control a first power transmission state in which power is transmitted at a first amount of power, and a second power transmission state in which power is transmitted at a second amount of power greater than the first amount of power.

In the sixth embodiment, the power control unit is able to appropriately and simply control the transmission power of the power transmission apparatus since the power control unit controls an amount of transmission power in a stepwise manner in the first power transmission state and the second power transmission state.

[Sixth Embodiment]

In the following, the sixth embodiment is described. A difference from the first embodiment is mainly described below.

Specifically, in the first embodiment, the control unit 13B configures the power control unit configured to control the power transmission state (power transmission state and intermittent power transmission state described later) in which the transmission power of the power transmission apparatus 10 is controlled in a state in which the power transmission target power reception apparatus 20 is detected, and the test power transmission state in which the transmission power of the power transmission apparatus 10 is controlled in a state in which the power transmission target power reception apparatus 20 is not detected.

On the other hand, in the sixth embodiment the control unit 13B configures a power control unit configured to control transmission power of the power transmission apparatus 10, based on at least one of the number of power transmission target power reception apparatuses 20 and a type of the power transmission target power reception apparatus 20.

Here, it is preferable that the power transmission target power reception apparatus 20 is a power reception apparatus 20 authenticated by the power transmission apparatus 10 (control apparatus). Therefore, it is preferable that the number of power transmission target power reception apparatuses 20 is the number of the power reception apparatus 20 authenticated by the power transmission apparatus 10 (control apparatus).

(State Transition of Power Transmission Apparatus)

Figure 13:
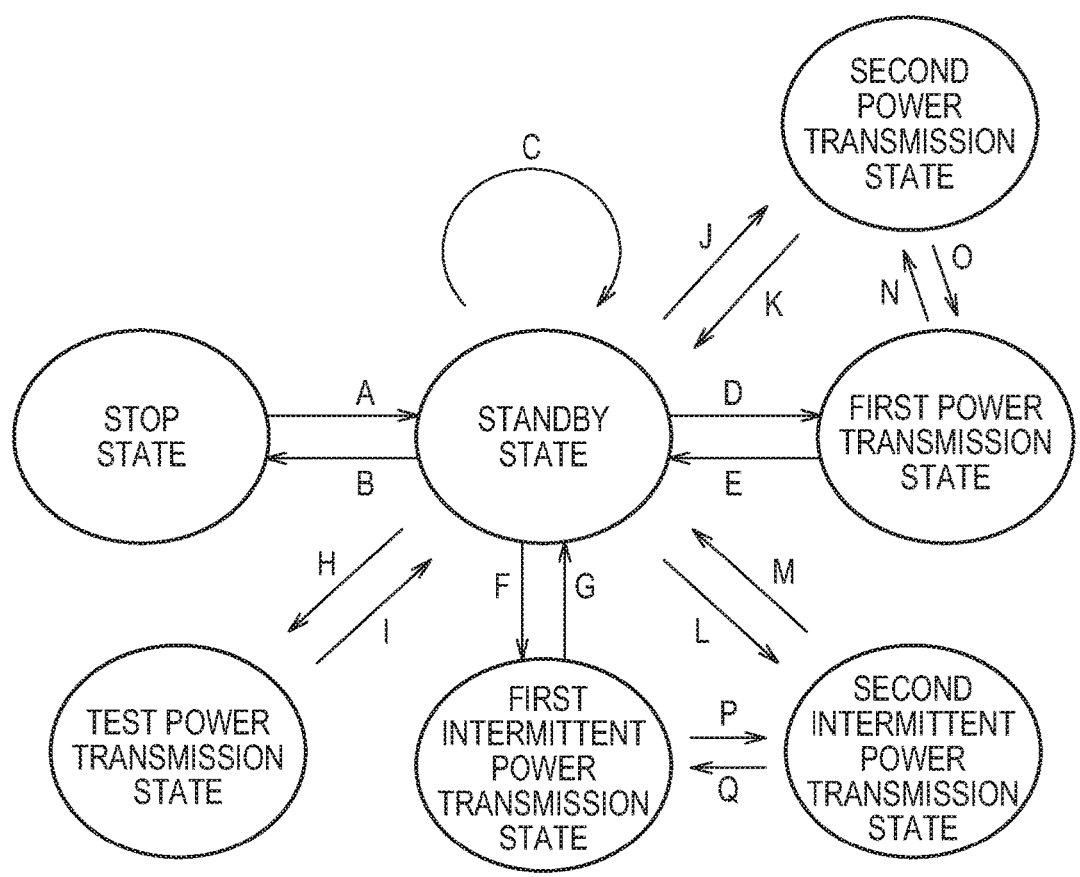
FIG. 13 is a diagram illustrating state transition of the power transmission apparatus 10 according to a sixth embodiment.

In the following, state transition is described of the power transmission apparatus according to the sixth embodiment. FIG. 13 is a diagram illustrating state transition of the power transmission apparatus 10 according to the sixth embodiment.

As illustrated in FIG. 13, the state of the power transmission apparatus 10 includes a stop state, a standby state, a first power transmission state, a first intermittent power transmission state, a test power transmission state, a second power transmission state, and a second intermittent power transmission state.

The stop state is a state in which power transmission is completely stopped. In detail, the stop state is a state in which the power transmission apparatus 10 is not started.

The standby state is a state in which power is not transmitted, however, power transmission is ready. The standby state is a state in which the power transmission target power reception apparatus 20 is not detected, and a state in which the power supply of the power transmission apparatus 10 is started.

The first power transmission state is a state in which power is continuously transmitted to the power transmission target power reception apparatus 20 at first power. The first power transmission state is, for example, a state in which transmission power is continuously transmitted when only the power transmission target power reception apparatus 20 not having a power storage unit is detected. The first power transmission state is a first power transmission state in which power is transmitted at the first amount of power as an amount of transmission power per unit time.

The first intermittent power transmission state is a state in which power is intermittently transmitted at a first frequency to the power transmission target power reception apparatus 20. The first intermittent power transmission state is, for example, a state in which power is intermittently transmitted at the first frequency when only the power transmission target power reception apparatus 20 having the power storage unit is detected. Incidentally, in FIG. 13, although the first intermittent power transmission state is separately defined from the first power transmission state, the first intermittent power transmission state can be considered to be a part of the first power transmission state in which power is transmitted at the first amount of power as the amount of transmission power per unit time.

The test power transmission state is a state in which transmission power is transmitted in a state in which the power transmission target power reception apparatus 20 is not detected. In detail, the test power transmission state is a state in which transmission power is transmitted so that a signal (for example, authentication ID described above) can be returned from the power reception apparatus 20 by transmitting power necessary for a communication module 23 of the power reception apparatus 20 to communicate.

Incidentally, a power transmission method in the test power transmission state can be different from a power transmission method in the power transmission state and a power transmission method in the intermittent power transmission state. For example, the power transmission method in the test power transmission state is a method repeating a power transmission period in which power is transmitted and a non-power transmission period in which power is not transmitted. It is preferable that the power transmission period in the test power transmission state is longer than the power transmission period in the intermittent power transmission state. Alternatively, the power transmission method in the test power transmission state can be a method for continuously transmitting transmission power smaller than transmission power in the power transmission state and the intermittent power transmission state.

The second power transmission state is a state in which power is continuously transmitted to the power transmission target power reception apparatus 20 at second power greater than the first power. The second power transmission state is, for example, a state in which power is continuously transmitted when only the power transmission target power reception apparatus 20 not having the power storage unit is detected. The second power transmission state is a second power transmission state in which power is transmitted at the second amount of power greater than the first amount of power as the amount of transmission power per unit time.

The second intermittent power transmission state is a state in which power is intermittently transmitted to the power transmission target power reception apparatus 20 at a second frequency higher than the first frequency. The second intermittent power transmission state is, for example, a state in which power is intermittently transmitted at the second frequency when only the power transmission target power reception apparatus 20 having the power storage unit is detected. Incidentally, in FIG. 13, although the second intermittent power transmission state is separately defined from the second power transmission state, the second intermittent power transmission state can be considered to be an aspect of the second power transmission state in which power is transmitted at the second amount of power greater than the first amount of power as the amount of transmission power per unit time.

A trigger A for transitioning to the standby state from the stop state is, for example, an event in which the power transmission apparatus 10 is started (event in which power is supplied to the power transmission apparatus 10). A trigger B for transitioning to the stop state from the standby state is, for example, occurrence of an event in which power is disconnected of the power transmission apparatus 10. A trigger C to keep the standby state is occurrence of an event in which the power transmission target power reception apparatus 20 is not detected.

A trigger D for transitioning to the first power transmission state from the standby state is occurrence of an event in which the power transmission target power reception apparatus 20 not having the power storage unit is detected. In the sixth embodiment, a condition of the trigger D is satisfied, for example, when the number of power transmission target power reception apparatuses 20 is equal to or less than a predetermined number. Alternatively, a condition of the trigger D is satisfied, for example, when the power reception apparatus 20 having (using) an application (load) in which an amount of variation in power consumption is greater than a predetermined value, is not included as the power transmission target power reception apparatus 20. A trigger E for transitioning to the standby state from the first power transmission state is occurrence of an event in which all of the power transmission target power reception apparatuses 20 detected are no longer detected. Alternatively, the trigger E is occurrence of an event in which power transmission stop is requested from all of the power transmission target power reception apparatuses 20.

A trigger F for transitioning to the first intermittent power transmission state from the standby state is occurrence of an event in which the power transmission target power reception apparatus 20 having power storage unit is detected. In the sixth embodiment, a condition of the trigger F is satisfied, for example, when the number of power transmission target power reception apparatuses 20 is equal to or less than a predetermined number. Alternatively, a condition of the trigger F is satisfied, for example, when the power reception apparatus 20 having (using) the application (load) in which an amount of variation in power consumption is greater than a predetermined value, is not included as the power transmission target power reception apparatus 20. A trigger G for transitioning to the standby state from the first intermittent power transmission state is occurrence of an event in which all of the power transmission target power reception apparatuses 20 detected are no longer detected. Alternatively, the trigger G is occurrence of an event in which power transmission stop is requested from all of the power transmission target power reception apparatuses 20.

A trigger H for transitioning to the test power transmission state from the standby state is occurrence of an event in which the state transitions to the standby state from the stop state. That is, the trigger H, same as the trigger A, is occurrence of an event in which the power transmission apparatus 10 is started (event in which power is supplied to the power transmission apparatus 10). That is, when the power transmission apparatus 10 is started from the stop state, it transitions to the standby state, and immediately after that, transitions to the test power transmission state. Incidentally, it can transition directly to the test power transmission state without going through the standby state from the stop state. Alternatively, the trigger H is occurrence of an event in which a state (standby state) continues over a certain period of time in which the power transmission apparatus 10 does not transmit power. Alternatively, the trigger H is user operation. A trigger I for transitioning to the standby state from the test power transmission state is occurrence of an event in which the test power transmission state continues over a certain period of time. Alternatively, the trigger I is occurrence of an event in which a response signal to a search signal (for example, authentication ID, category information) is received from the power reception apparatus 20. In addition, it can transition directly to the power transmission state without going through the standby state from the test state. In addition, the trigger for transitioning to the power transmission state from the test state can be a case where the authentication ID is received from the power reception apparatus 20 and authentication succeeds, or a case where category information is received after authentication succeeds. Here, by "authentication succeeds", it is indicated, for example, that the authentication ID received matches an authentication ID stored in advance.

A trigger J for transitioning to the second power transmission state from the standby state is occurrence of an event in which the power transmission target power reception apparatus 20 not having power storage unit is detected. In the sixth embodiment, a condition of trigger J is satisfied, for example, when the number of power transmission target power reception apparatuses 20 is greater than a predetermined number. Alternatively, a condition of the trigger J is satisfied, for example, when the power reception apparatus 20 having an application in which an amount of variation in power consumption is greater than a predetermined value, is included as the power transmission target power reception apparatus 20. A trigger K for transitioning to the standby state from the second power transmission state is occurrence of an event in which all of the power transmission target power reception apparatuses 20 detected are no longer detected. Alternatively, the trigger K is occurrence of an event in which power transmission stop is requested from all of the power transmission target power reception apparatuses 20.

A trigger L for transitioning to the second intermittent power transmission state from the standby state is occurrence of an event in which the power transmission target power reception apparatus 20 having the power storage unit is detected. In the sixth embodiment, a condition of the trigger L is satisfied, for example, when the number of power transmission target power reception apparatuses 20 is greater than a predetermined number. Alternatively, a condition of the trigger L is satisfied, for example, when the power reception apparatus 20 having an application in which an amount of variation in power consumption is greater than a predetermined value, is included as the power transmission target power reception apparatus 20. A trigger M for transitioning to the standby state from the second intermittent power transmission state is occurrence of an event in which all of the power transmission target power reception apparatuses 20 detected are no longer detected. Alternatively, the trigger M is occurrence of an event in which power transmission stop is requested from all of the power transmission target power reception apparatuses 20.

In FIG. 13, the state transition is exemplified between the standby state and the second power transmission state, however, the embodiment is not limited thereto. For example, the power transmission state of the power transmission apparatus 10 can transition between the first power transmission state and the second power transmission state. A trigger for transitioning to the second power transmission state from the first power transmission state is occurrence of an event in which the number of power transmission target power reception apparatuses 20 is greater than a predetermined number, or an event in which the power reception apparatus 20 having an application in which an amount of variation in power consumption is greater than a predetermined value, is included as the power transmission target power reception apparatus 20. On the other hand, a trigger for transitioning to the first power transmission state from the second power transmission state is occurrence of an event in which the number of power transmission target power reception apparatuses 20 is equal to or less than the predetermined number, or an event in which the power reception apparatus 20 having the application in which the amount of variation in power consumption is greater than the predetermined value, is not included as the power transmission target power reception apparatus 20.

Similarly, in FIG. 13, state transition is exemplified between the standby state and the second intermittent power transmission state; however, the embodiment is not limited thereto. For example, the intermittent power transmission state of the power transmission apparatus 10 can transition between the first intermittent power transmission state and the second intermittent power transmission state. A trigger for transitioning to the second intermittent power transmission state from the first intermittent power transmission state is occurrence of an event in which the number of power transmission target power reception apparatuses 20 is greater than a predetermined number, or an event in which the power reception apparatus 20 having an application in which an amount of variation in power consumption is greater than a predetermined value, is included as the power transmission target power reception apparatus 20. On the other hand, a trigger for transitioning to the first intermittent power transmission state from the second intermittent power transmission state is occurrence of an event in which the number of power transmission target power reception apparatuses 20 is equal to or less than the predetermined number, or an event in which the power reception apparatus 20 having the application in which the amount of variation in power consumption is greater than the predetermined value, is not included as the power transmission target power reception apparatus 20.

A trigger N (or, trigger P) for transitioning to the second power transmission state (or, second intermittent power transmission state) from the first power transmission state (or, first intermittent power transmission state) is occurrence of an event in which a request is received for executing an application of high power consumption, from the power reception apparatus 20, and occurrence of an event in which a request is received indicating that the power reception apparatus 20 transitions to a high load state. A trigger O (or, trigger Q) for transitioning to the first power transmission state (or, first intermittent power transmission state) from the second power transmission state (or, second intermittent power transmission state) is occurrence of an event in which a notification is received indicating that execution of the high power consumption application is ended, from the power reception apparatus 20, and occurrence of an event in which a notification is received indicating that the state transitions to a power reception state (low load state) from the high load state, from the power reception apparatus 20.

Incidentally, in the above-described example illustrated in FIG. 8, the power transmission state applied to the power reception apparatus A can be the first power transmission state, and can be the second power transmission state. Similarly, the intermittent power transmission state applied to the power reception apparatus B can be the first intermittent power transmission state, and can be the second intermittent power transmission state.

(Function and Effect)

In the sixth embodiment, the control unit 13B is able to appropriately and simply control the transmission power of the power transmission apparatus since the control unit 13B controls the amount of transmission power per unit time in a stepwise manner in the first power transmission state and the second power transmission state.

[Modification]

In the following, a modification of the sixth embodiment is described. A difference from the sixth embodiment is mainly described below. Specifically, in the modification, state transition of the power reception apparatus is mainly described.

(State Transition of Power Reception Apparatus)

Figure 14:
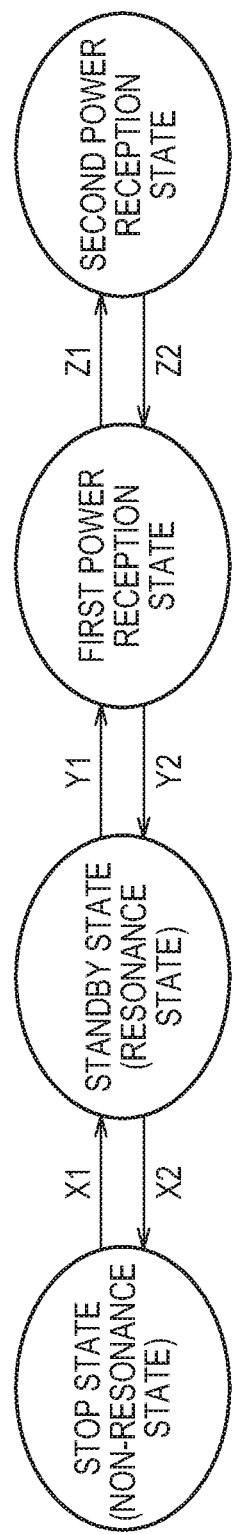
FIG. 14 is a diagram illustrating state transition of the power reception apparatus 20 according to a modification of the sixth embodiment.

In the following, state transition is described of the power reception apparatus according to the modification. FIG. 14 is a diagram illustrating state transition of the power reception apparatus 20 according to the modification.

As illustrated in FIG. 14, the state of the power reception apparatus 20 includes a stop state, a standby state, a first power reception state, a second power reception state.

The stop state is a state in which power reception is completely stopped. In detail, the stop state is a state in which a resonance frequency of a resonator of the power reception apparatus 20 does not match a resonance frequency of a resonator of the power transmission apparatus 10, and hereinafter, this state is also referred to as a non-resonance state. The non-resonance state is a state in which it is impossible to resonate with a magnetic field generated from the power transmission apparatus 10. When the resonator of the power reception apparatus 20 is in the non-resonance state, the power reception apparatus 20 is not able to receive power supplied from the power transmission apparatus 10 since the resonator of the power reception apparatus 20 does not resonate with the magnetic field generated from the resonator of the power transmission apparatus 10.

The standby state is a state in which power is not received, however, the power reception is ready. The standby state is a state in which the resonance frequency of the resonator of the power reception apparatus 20 matches the resonance frequency of the resonator of the power transmission apparatus 10, and hereinafter, this state is also referred to as a resonance state. The resonance state is a state in which it is possible to resonate with the magnetic field generated from the power transmission apparatus 10. When the resonator of the power reception apparatus 20 is in the resonance state, the power reception apparatus 20 is able to receive power supplied from the power transmission apparatus 10 due to the fact that the resonator of the power reception apparatus 20 resonates with the magnetic field generated from the resonator of the power transmission apparatus 10.

The first power reception state is a state in which power is received at power smaller than a predetermined threshold value. For example, the first power reception state is a state in which an application (load 22C) is driven of power consumption smaller than the predetermined threshold value. For example, when the power reception apparatus 20 is in the first power reception state, the power transmission apparatus 10 operates in the first power transmission state (or, first intermittent power transmission state) described above. The first power reception state is an example of the low load state described above.

The second power reception state is a state in which power is received at greater power than the predetermined threshold value. For example, the second power reception state is a state in which an application (load 22C) is driven of greater power consumption than the predetermined threshold value. For example, when the power reception apparatus 20 is in the second power reception state, the power transmission apparatus 10 operates in the second power transmission state (or, second intermittent power transmission state) described above. The second power reception state is an example of the high load state described above.

A trigger X1 for transitioning to the standby state from the stop state is, for example, occurrence of an event in which the power reception apparatus 20 is started. In addition, the trigger X1 can be a trigger to end power reception operation of the power reception apparatus 20. In such a case, the power reception apparatus 20 (control unit 23B) adjusts a resonance frequency of a power reception side resonator 21 by adjusting capacity of a capacitor C depending on the trigger X1 to transition to the resonance state. A trigger X2 for transitioning to the stop state from the standby state is, for example, occurrence of an event in which power is disconnected of the power reception apparatus 20. In addition, the trigger X2 can be a trigger to start power reception operation of the power reception apparatus 20. In such a case, the power reception apparatus 20 (control unit 23B) adjusts the resonance frequency of the power reception side resonator 21 by adjusting the capacity of the capacitor C depending on the trigger X2 to transition to the non-resonance state.

A trigger Y1 for transitioning to the first power reception state from the standby state is, for example, occurrence of an event in which an application (load 22C) is started of power consumption smaller than the predetermined threshold value. A trigger Y2 for transitioning to the standby state from the first power reception state is, for example, occurrence of an event in which the application (load 22C) is ended of power consumption smaller than the predetermined threshold value. It is preferable that the power reception apparatus 20 transmits to the power transmission apparatus 10 a notification that the trigger Y1 or the trigger Y2 is detected, depending on detection of the trigger Y1 or the trigger Y2.

A trigger Z1 for transitioning to the second power reception state from the first power reception state is, for example, occurrence of an event in which an application (load 22C) is started of greater power consumption than the predetermined threshold value. A trigger Z2 for transitioning to the first power reception state from the second power reception state is, for example, occurrence of an event in which the application (load 22C) is ended of greater power consumption than the predetermined threshold value. It is preferable that the power reception apparatus 20 transmits to the power transmission apparatus 10 a notification that the trigger Z1 or the trigger Z2 is detected, depending on detection of the trigger Z1 or the trigger Z2.

In addition, when the event occurs of the above trigger Z1 and trigger Z2 from the standby state, it is possible to transition directly to the second power reception state without going through the first power reception state.

Here, it is preferable that permission is necessary of the power transmission apparatus 10, the EMS, or the like when transitioning to the second power reception state from the first power reception state. The permission may not be necessary of the power transmission apparatus 10, the EMS, or the like when transitioning to the first power reception state from the second power reception state.

[Summary of Seventh Embodiment]

In the guidelines on the utilization of the radio power transmission system, it is defined that power transmission is permitted from a power transmission apparatus only when a distance between the power transmission apparatus and a power reception apparatus is within a predetermined distance. In view of such a circumstance, a technique is demanded for grasping the distance between the power transmission apparatus and the power reception apparatus, and stopping power transmission of the power transmission apparatus when needed.

However, to grasp the distance between the power transmission apparatus and the power reception apparatus, it is necessary to provide, for example, a GPS or an ultrasonic sensor, and it may cause increase in size or cost of the apparatus.

On the other hand, a control apparatus according to a seventh embodiment is used in a power transmission system for transmitting power with a magnetic resonance manner to a power reception apparatus from a power transmission apparatus. The control apparatus comprises a control unit configured to acquire a power transmission voltage of the power transmission apparatus, or a power reception voltage of the power reception apparatus. The control unit stops the power transmission of the power transmission apparatus when the power transmission voltage acquired is above a power transmission voltage threshold value corresponding to maximum power transmission efficiency of the power transmission apparatus, or when the power reception voltage acquired is below a power reception voltage threshold value corresponding to an allowable maximum distance between the power transmission apparatus and the power reception apparatus.

In the seventh embodiment, the control apparatus stops power transmission of the power transmission apparatus when the power transmission voltage is above the power transmission voltage threshold value, or when the power reception voltage is below the power reception voltage threshold value. Thus, power transmission can be stopped of the power transmission apparatus when needed without causing increase in size or cost of the apparatus.

[Seventh Embodiment]

Figure 15:
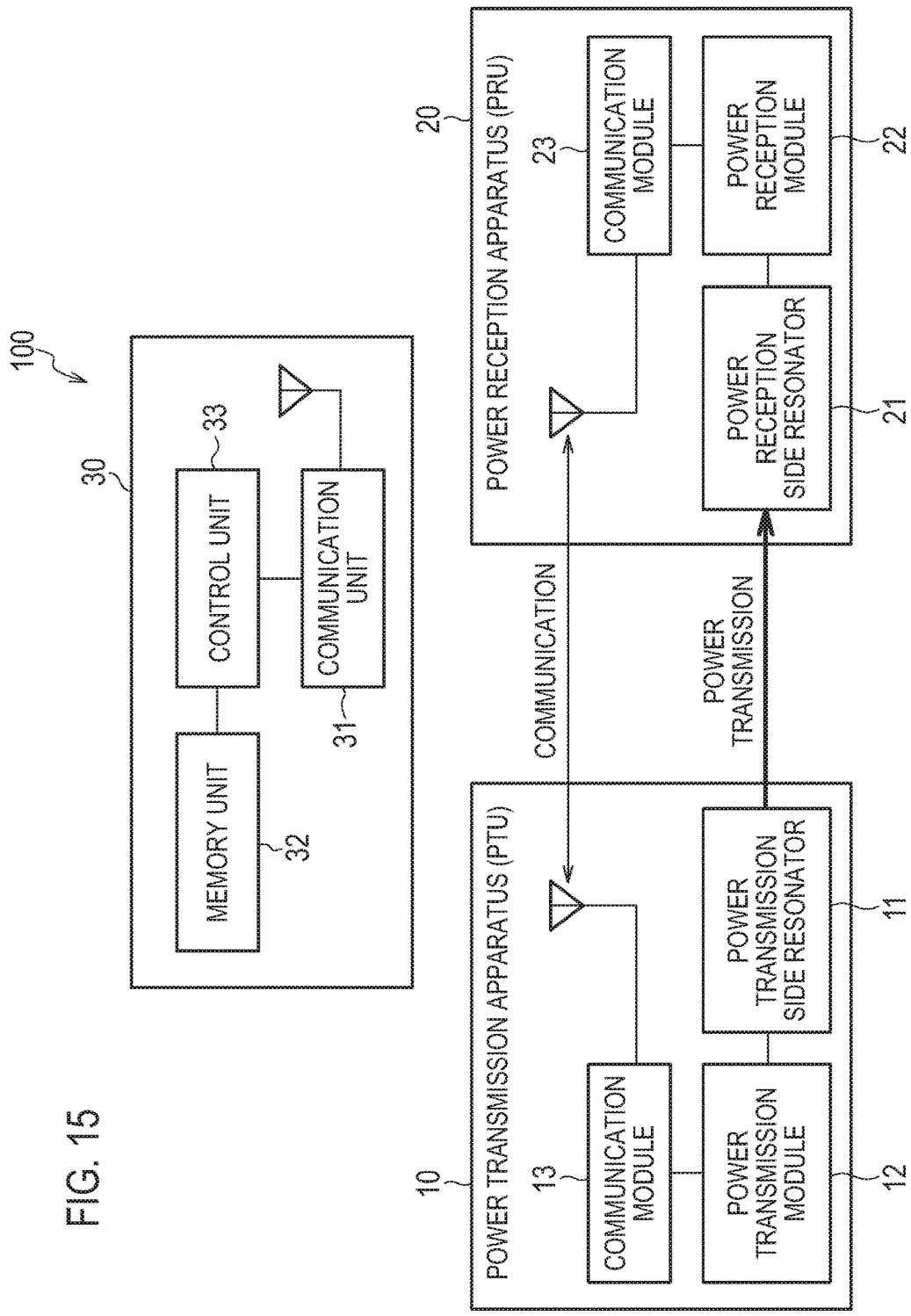
FIG. 15 is a diagram illustrating a power transmission system 100 according to a seventh embodiment.
Figure 16:
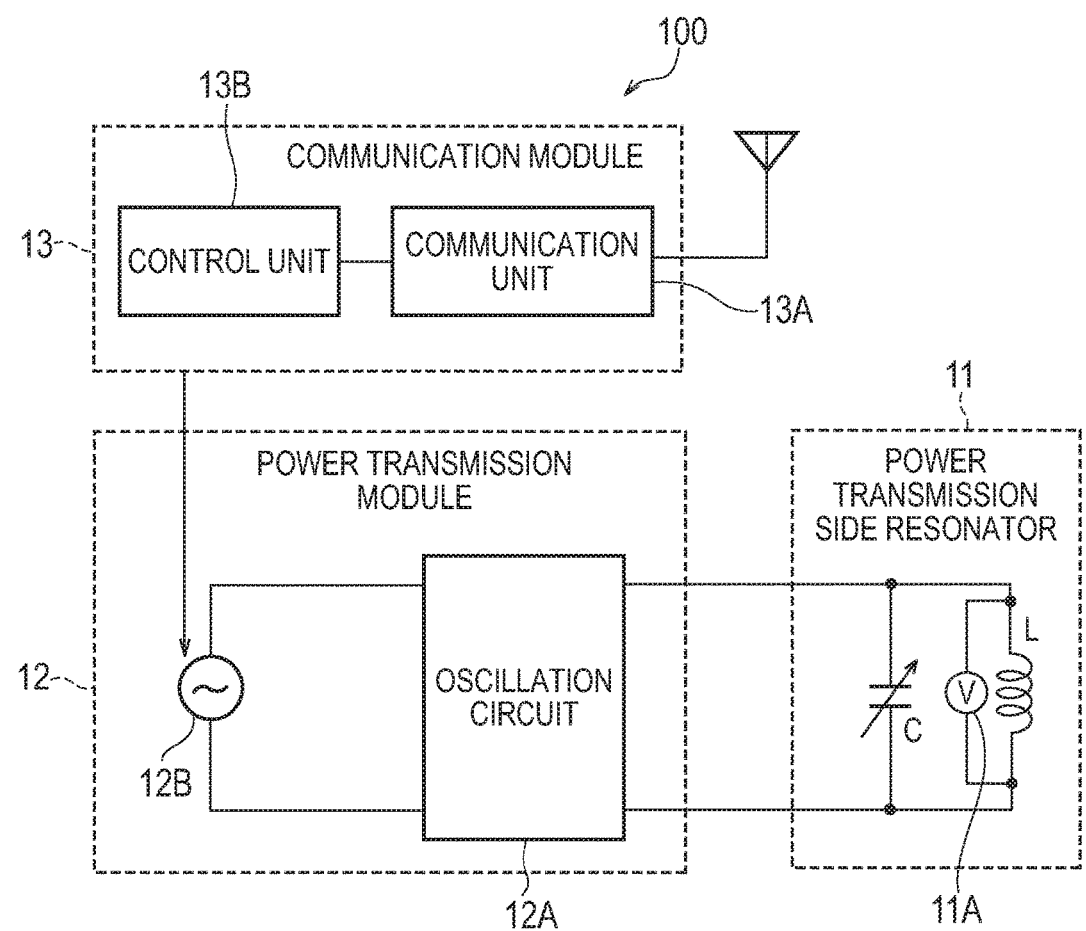
FIG. 16 is a diagram illustrating a power transmission apparatus 10 according to the seventh embodiment.
Figure 17:
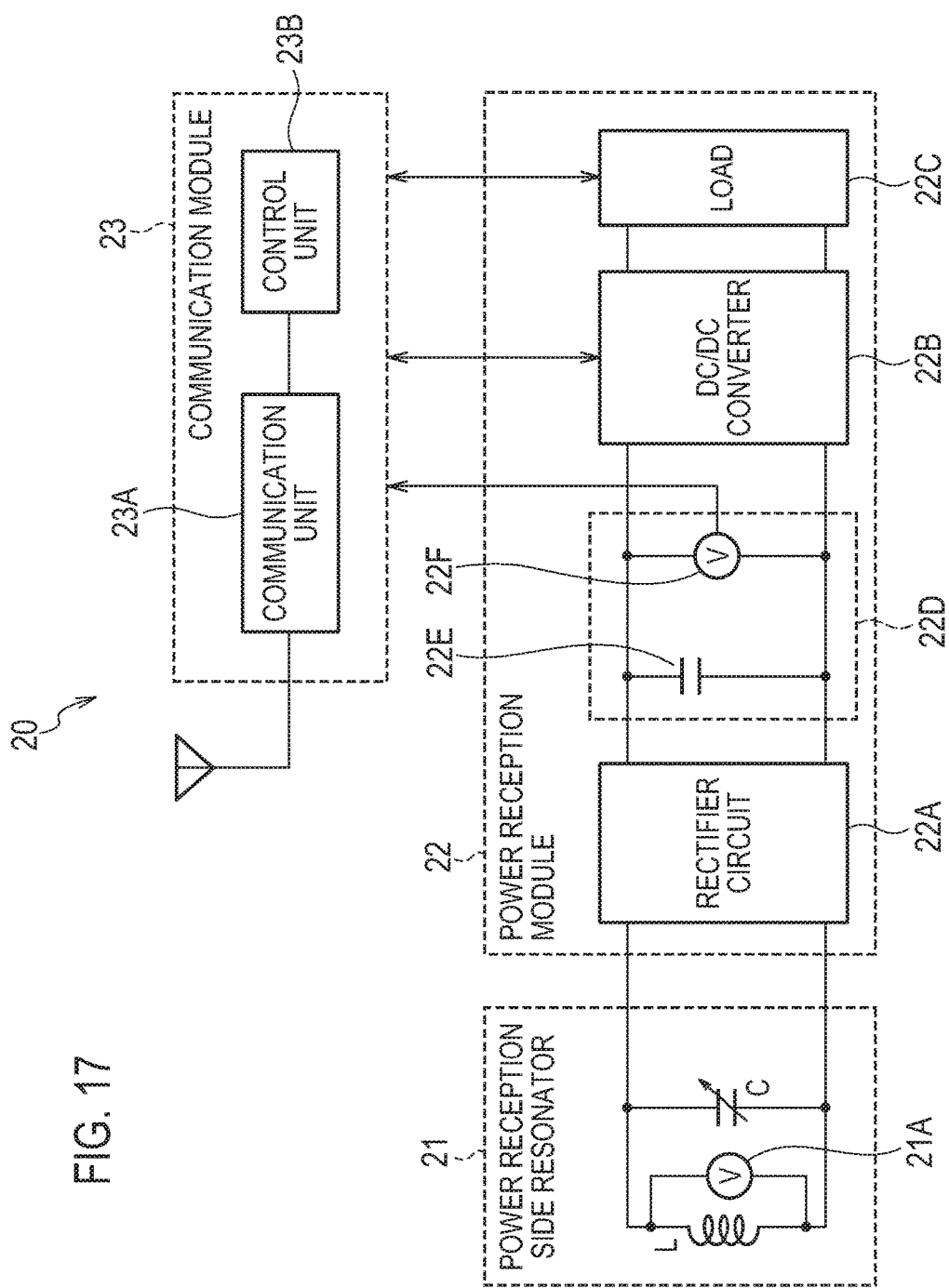
FIG. 17 is a diagram illustrating a power reception apparatus 20 according to the seventh embodiment.

(Power Transmission System) In the following, the power transmission system according to the seventh embodiment is described. FIG. 15 is a diagram illustrating a power transmission system 100 according to the seventh embodiment. FIG. 16 is a diagram illustrating a power transmission apparatus 10 according to the seventh embodiment. FIG. 17 is a diagram illustrating a power reception apparatus 20 according to the seventh embodiment.

As illustrated in FIG. 15, the power transmission system 100 includes the power transmission apparatus 10 and the power reception apparatus 20, and is a system for transmitting power with a magnetic resonance manner to the power reception apparatus 20 from the power transmission apparatus 10. In FIG. 15, one power reception apparatus 20 is exemplified; however, a plurality of the power reception apparatuses 20 can be provided to the power transmission system 100. The power reception apparatus 20 includes a load operated by power transmitted by the power transmission apparatus 10. The power reception apparatus 20 can be, for example, sensors (human detection sensor, temperature sensor, illumination sensor) provided at each position in a room, or can be a portable equipment such as a remote controller, a smart phone, or a tablet terminal. The power transmission apparatus 10 is embedded, for example, in the ceiling or under the floor of the room to transmit power to the power reception apparatus 20. The power transmission apparatus 10 may also be referred to as a PTU (Power Transmitting Unit), and the power reception apparatus 20 may also be referred to as a PRU (Power Receiving Unit).

In the seventh embodiment, the power transmission system 100 further includes an EMS (Energy Management System) 30 being an example of the control apparatus configured to control power of a consumer's facility. The EMS 30 includes an HEMS (Home Energy Management System) provided to a home, a BEMS (Building Energy Management System) provided to a building, an FEMS (Factory Energy Management System) provided to a factory, and an SEMS (Store Energy Management System) provided to a store.

As illustrated in FIG. 15, the power transmission apparatus 10 has a power transmission side resonator 11, a power transmission module 12, and a communication module 13.

The power transmission side resonator 11 is a resonator adjusted to resonate at a specific frequency. Specifically, as illustrated in FIG. 16, the power transmission side resonator 11 is configured by a capacitor C and an inductance L (coil). For example, by adjusting capacity of the capacitor C, a resonance frequency of the power transmission side resonator 11 can be adjusted to the specific frequency.

The power transmission side resonator 11 further has a voltmeter 11A for detecting voltage of an inductance L. A voltage value detected by the voltmeter 11A is hereinafter referred to as power transmission voltage of the power transmission apparatus 10.

The power transmission module 12 is a module for transmitting power. Specifically, as illustrated in FIG. 16, the power transmission module 12 has an oscillation circuit 12C and a power supply 12D. The oscillation circuit 12C is a circuit for adjusting a frequency of AC power supplied from the power supply 12D by using an inverter or an oscillator to a desired frequency to produce the resonance frequency.

The communication module 13 is a module for communicating with the power reception apparatus 20. The communication module 13 communicates with the EMS 30 described above. Specifically, the communication module 13 has a communication unit 13A and a control unit 13B.

The communication unit 13A is connected to the power reception apparatus 20 wirelessly or via a wire, and transmits a signal to the power reception apparatus 20 and the EMS 30, and receives a signal from the power reception apparatus 20 and the EMS 30. For example, the communication unit 13A transmits a search signal for searching the power reception apparatus 20. The communication unit 13A transmits an information request for requesting transmission of information for specifying a type of the power reception apparatus 20. On the other hand, the communication unit 13A receives an authentication ID of the power reception apparatus 20. The authentication ID is returned from the power reception apparatus 20 depending on the search signal. The communication unit 13A receives the information for specifying the type of the power reception apparatus 20. The information for specifying the type of the power reception apparatus 20 is returned from the power reception apparatus 20 depending on the information request.

The communication unit 13A transmits to the EMS 30 the power transmission voltage of the power transmission apparatus 10. In addition, the communication unit 13A receives from the power reception apparatus 20 information indicating received signal intensity of the signal received by the power reception apparatus 20 from the power reception apparatus 20. The communication unit 13A transmits to the EMS 30 the information indicating the received signal intensity of the signal received by the power reception apparatus 20.

The control unit 13B controls the power transmission module 12 and the communication module 13. For example, the control unit 13B controls transmission power of the power transmission apparatus 10. Specifically, the control unit 13B controls the transmission power of the power transmission apparatus 10 by controlling the power supply 12D, based on the information acquired by the communication unit 13A.

Here, it is preferable that the power transmission target power reception apparatus 20 is a power reception apparatus 20 authenticated by the power transmission apparatus 10. Therefore, it is preferable that the number of power transmission target power reception apparatuses 20 is the number of power reception apparatuses 20 authenticated by the power transmission apparatus 10.

It is preferable that the type of the power transmission target power reception apparatus 20 is identified by information indicating reception power of the power transmission target power reception apparatus 20, whether or not the power transmission target power reception apparatus 20 has a power storage unit, or capacity of the power storage unit included in the power transmission target power reception apparatus 20.

For example, the control unit 13B increases the transmission power of the power transmission apparatus 10, as the number of power transmission target power reception apparatuses 20 increases. Alternatively, the control unit 13B increases the transmission power of the power transmission apparatus 10, as the reception power of the power transmission target power reception apparatus 20 is greater.

As illustrated in FIG. 15, the power reception apparatus 20 has a power reception side resonator 21, a power reception module 22, and a communication module 23.

The power reception side resonator 21 is a resonator adjusted to resonate at a specific frequency. Specifically, as illustrated in FIG. 17, the power reception side resonator 21 is configured by the capacitor C and the inductance L (coil). For example, by adjusting capacity of the capacitor C, a resonance frequency of the power reception side resonator 21 can be adjusted to the specific frequency.

The power reception side resonator 21 further has a voltmeter 21A for detecting voltage of the inductance L. A voltage value detected by the voltmeter 21A is hereinafter referred to as power reception voltage of the power reception apparatus 20.

The power reception module 22 is a module for receiving power. Specifically, as illustrated in FIG. 17, the power reception module 22 has a rectifier circuit 22A, a DC/DC converter 22B, a load 22C, and a power storage unit 22D.

The rectifier circuit 22A converts AC power transmitted from the power reception side resonator 21 to DC power. The DC/DC converter 22B performs step-up conversion or step-down conversion of the power transmitted from the rectifier circuit 22A. The load 22C is operated by the power transmitted by the power transmission apparatus 10, and is, for example, sensors or a communication equipment.

The power storage unit 22D has a storage battery 22E and a voltmeter 22F. The storage battery 22E stores the power transmitted by the power transmission apparatus 10. The storage battery 22E is, for example, an electric double layer capacitor or secondary battery. The voltmeter 22F detects voltage of the storage battery 22E.

In FIG. 17, a case is exemplified in which the power reception module 22 has the power storage unit 22D; however, the embodiment is not limited thereto. That is, the power reception module 22 may not have the power storage unit 22D.

The communication module 23 is a module for communicating with the power transmission apparatus 10 and the EMS 30. It should be noted that the communication module 23 is operated by the power transmitted by the power transmission apparatus 10. Specifically, the communication module 23 has a communication unit 23A and a control unit 23B.

The communication unit 23A is connected to the power transmission apparatus 10 wirelessly or via a wire, and transmits a signal to the power transmission apparatus 10 and the EMS 30, and receives a signal from the power transmission apparatus 10 and the EMS 30. For example, as described later, the communication unit 23A receives the search signal for searching the power reception apparatus 20. The communication unit 23A receives an information request for requesting transmission of information for specifying the type of the power reception apparatus 20. On the other hand, the communication unit 23A transmits an authentication ID of the power reception apparatus 20 depending on the search signal. The communication unit 23A transmits the information for specifying the type of the power reception apparatus 20 depending on the information request.

The communication unit 23A transmits to the EMS 30 the power reception voltage of the power reception apparatus 20. In addition, the communication unit 23A transmits to the power transmission apparatus 10 the information indicating the received signal intensity of the signal received from the power transmission apparatus 10. The communication unit 23A transmits to the EMS 30 the information indicating the received signal intensity of the signal received from the power transmission apparatus 10.

The control unit 23B controls the power reception module 22 and the communication module 23. For example, the control unit 23B supplies appropriate power to the load 22C by control of the DC/DC converter 22B. Alternatively, the control unit 23B controls the load 22C depending on an instruction received from the EMS 30.

As illustrated in FIG. 15, the EMS 30 has a communication unit 31, a memory unit 32, and a control unit 33.

The communication unit 31 is connected to the power transmission apparatus 10 wirelessly or via a wire, and transmits a signal to the power transmission apparatus 10, and receives a signal from the power transmission apparatus 10. In addition, the communication unit 31 is connected to the power reception apparatus 20 wirelessly or via a wire, and transmits a signal to the power reception apparatus 20, and receives a signal from the power reception apparatus 20.

The memory unit 32 stores the information acquired via the communication unit 31.

In the seventh embodiment, the control unit 33 acquires the power reception voltage of the power reception apparatus 20. In addition, the control unit 33 acquires the received signal intensity of the signal received from the power transmission apparatus 10 by the power reception apparatus 20. Specifically, the communication unit 31 receives the signal indicating the power reception voltage of the power reception apparatus 20 and the received signal intensity of the signal, and the control unit 33 acquires the power reception voltage of the power reception apparatus 20 and the received signal intensity from the communication unit 31.

In the seventh embodiment, the control unit 33 stops power transmission of the power transmission apparatus when the power reception voltage acquired is below the power reception voltage threshold value corresponding to the allowable maximum distance between the power transmission apparatus and the power reception apparatus.

(Application Scene)

Figure 18:
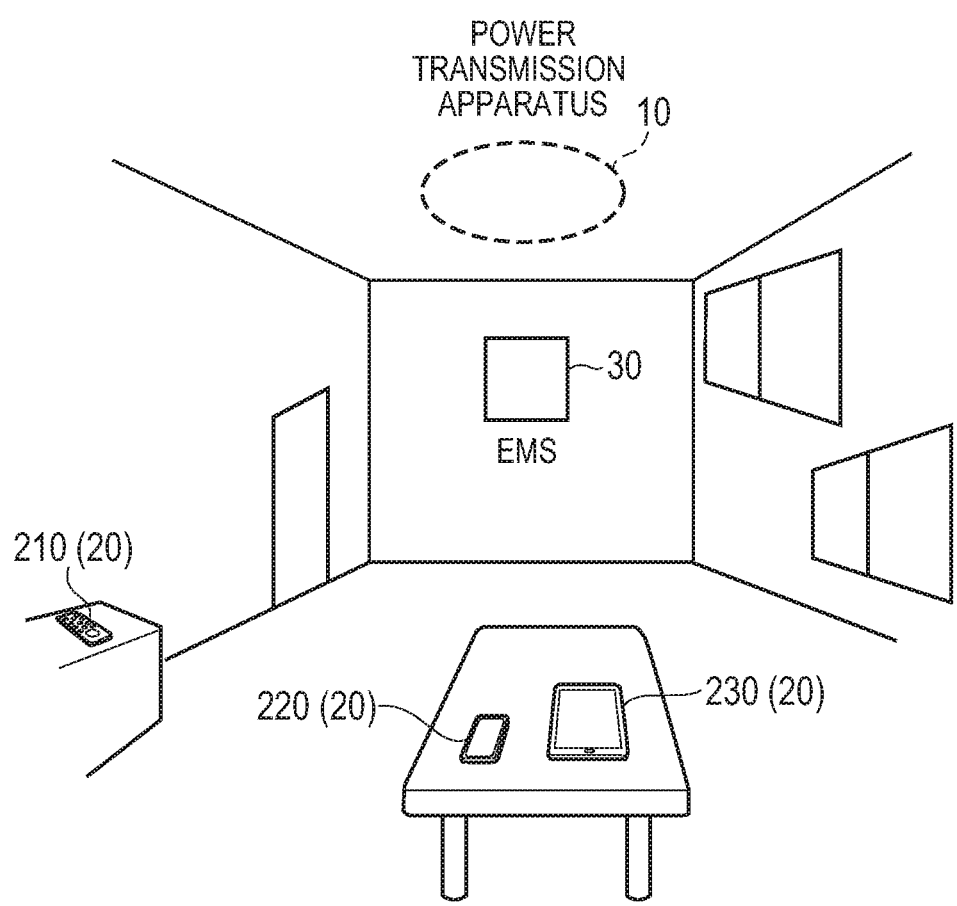
FIG. 18 is a diagram illustrating an application scene of the power transmission system 100 according to the seventh embodiment.

In the following, an application scene is described of the power transmission system 100 according to the seventh embodiment. FIG. 18 is a diagram illustrating the application scene of the power transmission system 100 according to the seventh embodiment.

As illustrated in FIG. 18, in the seventh embodiment, the power transmission system 100 includes a power transmission apparatus 10, an EMS 30, a remote controller 210, a smart phone 220, and a tablet terminal 230. The remote controller 210, the smart phone 220, and the tablet terminal 230 are examples of the power reception apparatus 20, and are operated by power transmitted with a magnetic resonance manner from power transmission apparatus 10.

Here, it should be noted that each of the remote controller 210, the smart phone 220, and the tablet terminal 230 is a portable equipment, and each distance from the power transmission apparatus 10 is not fixed.

In the guidelines on the utilization of the radio power transmission system, from the point of view of safety measures, it is defined that transmission of power is permitted from the power transmission apparatus 10 only when a distance (power transmission distance) is within the distance of design specification between the power transmission apparatus 10 and the power reception apparatus 20.

Therefore, it is desirable that power transmission is stopped of the power transmission apparatus 10 according to the guideline, when the power transmission distance is, for example, above an allowable maximum distance defined for each setting of a function of the power transmission apparatus 10, due to the fact that the power reception apparatus 20 (remote controller 210, smart phone 220, and tablet terminal 230) is moved. However, for measurement of the power transmission distance, for example, a GPS or an ultrasonic sensor is necessary, so that, in the seventh embodiment, as described below, the power transmission distance is estimated based on the power reception voltage of the power reception apparatus 20.

Figure 19A:
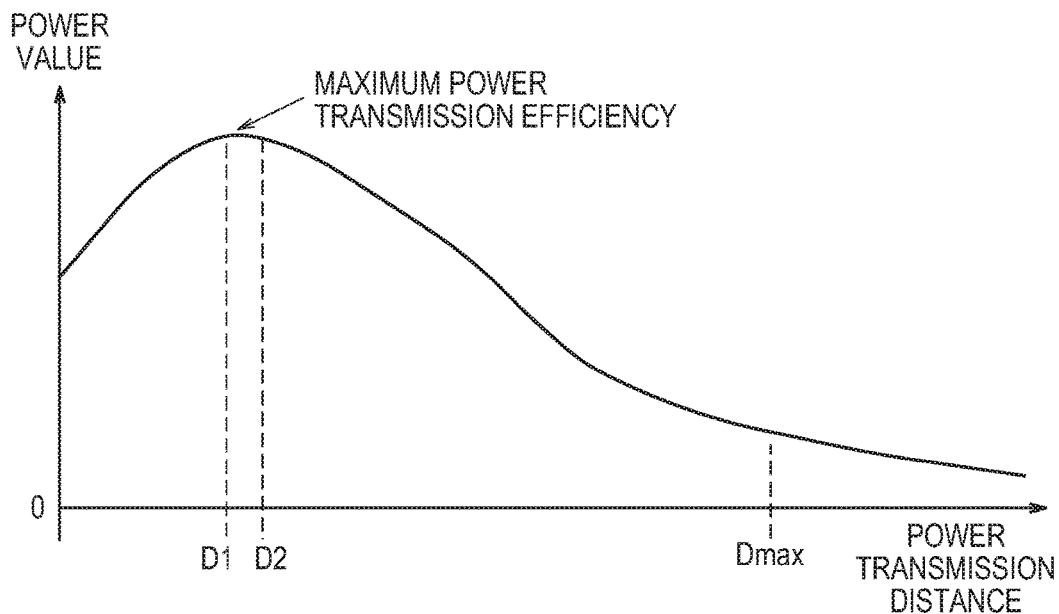
FIG. 19A is a diagram illustrating a relationship between power transmission distance and power transmission efficiency according to the seventh embodiment.

FIG. 19A is a diagram illustrating a relationship between the power transmission distance and the power transmission efficiency according to the seventh embodiment. In the magnetic resonance manner, the power transmission efficiency varies depending on the distance (power transmission distance) between the power transmission apparatus 10 and the power reception apparatus 20. Here, the power transmission efficiency is a ratio of the reception power of the power reception apparatus 20 to the transmission power of the power transmission apparatus 10. The power transmission distance is a distance between the power transmission side resonator 11 and the power reception side resonator 21.

When the distance between the power transmission apparatus 10 and the power reception apparatus 20 is a predetermined distance, a degree of magnetic coupling becomes optimal between the power transmission side resonator 11 and the power reception side resonator 21, and the maximum power transmission efficiency is obtained. The maximum power transmission efficiency is determined depending on the setting of the function of the power transmission apparatus 10. Hereinafter, a minimum value is D1, and a maximum value is D2 of the power transmission distance when the maximum power transmission efficiency is obtained.

When the power transmission distance is shorter than D1, the degree of magnetic coupling becomes excessive between the power transmission side resonator 11 and the power reception side resonator 21, and the power transmission efficiency is slightly below a threshold value. In addition, when the power transmission distance is longer than D2, the power transmission efficiency is decreased due to the fact that the degree of magnetic coupling is reduced between the power transmission side resonator 11 and the power reception side resonator 21. When the power transmission distance is above the allowable maximum distance defined in product specification, the reception power of the power reception apparatus 20 becomes close to zero. Here, the allowable maximum distance defined in the product specification is Dmax. Dmax is defined depending on the setting of the function of the power transmission apparatus 10.

Figure 19B:
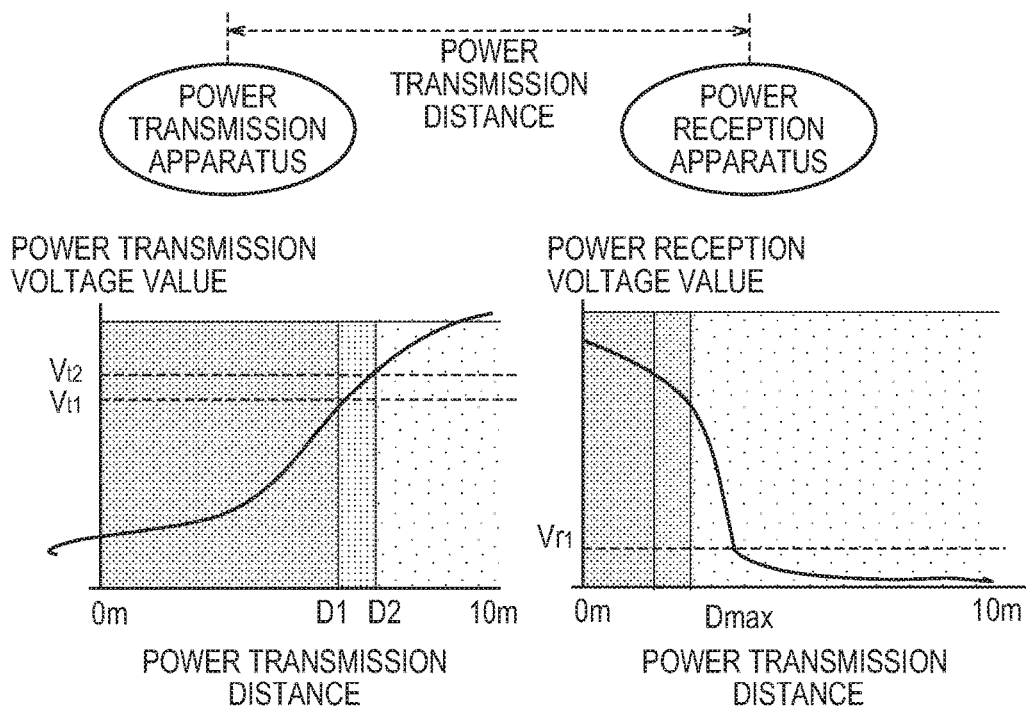
FIG. 19B is a diagram illustrating a relationship between the power transmission distance and transmission power of the power transmission apparatus 10, and between the power transmission distance and power reception voltage of the power reception apparatus 20.

FIG. 19B is a diagram illustrating a relationship between the power transmission distance and the transmission power of the power transmission apparatus 10, and between the power transmission distance and the power reception voltage of the power reception apparatus 20. As illustrated in FIG. 19B, the transmission power of the power transmission apparatus 10 increases as the power transmission distance becomes longer. In contrast, the reception power of the power reception apparatus 20 decreases as the power transmission distance becomes longer. Here, when the power transmission distances are D1, D2, the power transmission voltages are Vt1, Vt2, respectively. When the power transmission distance is Dmax, the power reception voltage is Vr1.

That is, when the power reception apparatus 20 is moved away from the power transmission apparatus 10, a detection value of the voltmeter 11A continues to increase. When the detection value of the voltmeter 11A is above Vt1, it is estimated that the power transmission distance is above D1, and the maximum power transmission efficiency is obtained. After that, when the detection value of the voltmeter 11A is above Vt2, it is estimated that the power transmission distance is above D2, and the power transmission efficiency is below the maximum power transmission efficiency.

In contrast, when the power reception apparatus 20 is moved away from the power transmission apparatus 10, the detection value of the voltmeter 21A continues to decrease. When the detection value of the voltmeter 21A is below Vr1, it is estimated that the power transmission distance becomes longer than Dmax, and the power transmission distance is above the allowable maximum distance.

(Control Method)

In the following, a control method according to the seventh embodiment is described. FIG. 20 is a flow diagram illustrating the control method according to the seventh embodiment. Here, the power reception apparatus 20 is a portable equipment, for example, any one of the remote controller 210, the smart phone 220, and the tablet terminal 230 illustrated in FIG. 18, and performs transmission and reception of the search signal and the authentication ID in advance with the power transmission apparatus 10, and is authenticated as the power transmission target power reception apparatus 20.

As illustrated in FIG. 20, in step S110, the EMS 30 acquires the power transmission distance for each power reception voltage of the power reception apparatus 20.

In step S120, the EMS 30 sets the power reception voltage threshold value corresponding to the allowable maximum distance. The power reception voltage threshold value is a power reception voltage in a case where the power transmission distance is the allowable maximum distance, and corresponds to the voltage value Vr1 of FIG. 19B.

In step S130, the EMS 30 acquires the power reception voltage. Specifically, the EMS 30 acquires the power reception voltage by receiving information indicating the power reception voltage from the power reception apparatus 20.

In step S140, the EMS 30 determines whether or not the power reception voltage acquired is below the power reception voltage threshold value (voltage value Vr1). When the determination result is YES, the EMS 30 proceeds to processing of step S150. In step S150, the EMS 30 stops power transmission of the power transmission apparatus 10. On the other hand, when the determination result is NO, the EMS 30 ends the processing and continues the power transmission of the power transmission apparatus 10.

As described above, in the seventh embodiment, the EMS 30 estimates the power transmission distance based on the power reception voltage of the power reception apparatus 20, and determines that the power transmission distance is above the allowable maximum distance Dmax when the power reception voltage of the power reception apparatus 20 is below the power reception voltage threshold value, and stops the power transmission of the power transmission apparatus 10. Thus, when the power transmission distance is above the allowable maximum distance defined in the product specification, the power transmission can be stopped of the power transmission apparatus 10.

In addition, in the seventh embodiment, the EMS 30 can use the received signal intensity of the signal received from the power transmission apparatus 10 by the power reception apparatus 20, for estimation of the power transmission distance. That is, the EMS 30 can stop the power transmission of the power transmission apparatus 10 when the power reception voltage acquired is below the power reception voltage threshold value (voltage value Vr1), and the received signal intensity acquired from the power reception apparatus 20 is below the received signal intensity corresponding to the allowable maximum distance. By using both of the power reception voltage and the received signal intensity for estimation of the power transmission distance, estimation accuracy can be improved, and the power transmission can be reliably stopped of the power transmission apparatus 10 when needed.

[Modification]

Hereinafter, a control method is described according to a modification of the seventh embodiment. FIG. 21 is a flow diagram illustrating the control method according to the modification of the seventh embodiment. Here, description is appropriately omitted of a common part to the seventh embodiment, and a difference from the seventh embodiment is mainly described.

In the seventh embodiment, although the power transmission distance is estimated based on the power reception voltage of the power reception apparatus 20, in the modification, the power transmission distance is estimated based on the power transmission voltage of the power transmission apparatus 10.

As illustrated in FIG. 21, in step S210, the EMS 30 acquires the power transmission efficiency for each power transmission voltage.

In step S220, the EMS 30 sets a threshold value corresponding to the maximum power transmission efficiency. Specifically, the EMS 30 sets the power transmission voltage at the time of initial power transmission of the power transmission apparatus 10 as the power transmission voltage threshold value. The power transmission voltage at the time of initial power transmission of the power transmission apparatus is a power transmission voltage in a case where power is transmitted in a state in which the power transmission target power reception apparatus 20 is not detected, and corresponds to Vt2 of FIG. 19B.

In step S230, the EMS 30 acquires the power transmission voltage. Specifically, the EMS 30 acquires the power transmission voltage by receiving information indicating the power transmission voltage from the power transmission apparatus 10.

In step S240, the EMS 30 determines whether or not the power transmission voltage acquired is above the power transmission voltage threshold value (voltage value Vt2). When the determination result is YES, the EMS 30 proceeds to processing of step S250. In step S250, the EMS 30 stops the power transmission of the power transmission apparatus 10. On the other hand, when the determination result is NO, the EMS 30 ends the processing and continues the power transmission of the power transmission apparatus 10.

As described above, in the modification, the EMS 30 estimates the power transmission distance based on the power transmission voltage of the power transmission apparatus 10, and determines that the power transmission distance is above D2 and the power transmission efficiency is below the maximum power transmission efficiency when the power transmission voltage of the power transmission apparatus 10 is above the power transmission voltage threshold value, and stops the power transmission of the power transmission apparatus 10. Thus, when the power transmission efficiency is below the maximum power transmission efficiency, the power transmission can be stopped of the power transmission apparatus 10.

In addition, in the modification, the EMS 30 can use the received signal intensity of the signal received from the power transmission apparatus 10 by the power reception apparatus 20, for estimation of the power transmission distance. That is, the EMS 30 can stop the power transmission of the power transmission apparatus 10 when the power transmission voltage acquired is above the power transmission voltage threshold value (voltage value Vt2), and the received signal intensity acquired from the power reception apparatus 20 is below the received signal intensity corresponding to the distance D2. By using both of the power transmission voltage and the received signal intensity for estimation of the power transmission distance, estimation accuracy can be improved, and the power transmission can be reliably stopped of the power transmission apparatus 10 when needed.

[Other Embodiments]

Although the present disclosure has been described according to the above embodiments, it should not be understood that the descriptions and the drawings configuring a part of the disclosure limit the disclosure. Various alternative embodiments, examples, and operational techniques will be apparent to those skilled in the art from the disclosure.

In the embodiments, communication between the power transmission apparatus 10 and the power reception apparatus 20 is performed by using communication modules (communication module 13 and communication module 23). However, the embodiments are not limited thereto. For example, the communication between the power transmission apparatus 10 and the power reception apparatus 20 can be performed by using a power transmission module 12 and a power reception module 22 (in-band communication).

In the embodiments, the case has been exemplified in which the power control unit configured to control the transmission power of the power transmission apparatus 10 is provided to the power transmission apparatus 10. However, the embodiments are not limited thereto. The power control unit configured to control the transmission power of the power transmission apparatus 10 can be provided to the EMS such as the HEMS.

In the second embodiment, the trigger E for transitioning to the standby state from the power transmission state is occurrence of an event in which all of the power transmission target power reception apparatuses 20 detected are no longer detected. However, the second embodiment is not limited thereto. For example, the trigger E can be an event in which temperature is above a predetermined threshold value of a component (for example, capacitor C or inductance L) configuring the power transmission apparatus 10 in the power transmission state. Alternatively, on the premise that the power transmission apparatus 10 receives the reception power information indicating an amount of power received by the power reception apparatus 20, the trigger E is occurrence of an event in which the reception power information is below the predetermined threshold value (for example, 10% of the reference power (Wref)). Alternatively, the trigger E is occurrence of an event in which, when the reception power information is below a predetermined threshold value, even if the transmission power of the power transmission apparatus 10 increases, the state is not be canceled in which the reception power information is below the predetermined threshold value. In addition, the power reception apparatus can transmit to the power transmission apparatus 10 information indicating abnormality when the reception power is smaller than predetermined power, and the power transmission apparatus 10 receiving the information can transition to the stop state from the power transmission state. Incidentally, the power transmission apparatus 10 can issue a warning when the information is received.

In the second embodiment, the trigger E has been mainly described for transitioning to the standby state from the power transmission state. However, the trigger F for transitioning to the standby state from the intermittent power transmission state can also be the event same as the trigger E.

In the fifth embodiment, the case has been exemplified in which the resonance control unit configured to control the resonance state of the power reception side resonator 21 is provided to the power reception apparatus 20. However, the fifth embodiment is not limited thereto. The resonance control unit configured to control the resonance state of the power reception side resonator 21 can be provided to the EMS such as the HEMS.

In the sixth embodiment, the case has been exemplified in which the amount of transmission power per unit time is controlled in two steps. However, the sixth embodiment is not limited thereto. The amount of transmission power per unit time can be controlled in three steps or more steps.

In the sixth embodiment, although the first power transmission state and the second power transmission state are provided as separate states, the sixth embodiment is not limited thereto. The first power transmission state and the second power transmission state can be states configuring part of the power transmission state. Similarly, in the sixth embodiment, although the first intermittent power transmission state and the second intermittent power transmission state are provided as separate states, the sixth embodiment is not limited thereto. The first intermittent power transmission state and the second intermittent power transmission state can be states configuring part of the intermittent power transmission state.

In the seventh embodiment, the case has been exemplified in which the control unit configured to control the transmission power of the power transmission apparatus 10 is provided to the EMS 30. However, the seventh embodiment is not limited thereto. The control unit configured to control the transmission power of the power transmission apparatus 10 can be provided to, for example, a communication module (control unit 13B) of the power transmission apparatus 10.

Although it is not particularly mentioned in the embodiments, a program can be provided with which a computer executes each processing performed by the power transmission apparatus 10 and the power reception apparatus 20. In addition, the program can be recorded in a computer readable medium. When using the computer readable medium, it is possible to install the program to the computer. Here, the computer readable medium recording the program can be a non-transitory recording medium. The non-transitory recording medium, it is not particularly limited, can be a recording medium such as CD-ROM or DVD-ROM, for example.

Alternatively, a chip can be provided configured by a memory for storing the program for executing each processing performed by the power transmission apparatus 10 and the power reception apparatus 20, and a processor for executing the program stored in the memory.

INDUSTRIAL APPLICABILITY

According to the present disclosure, a control apparatus can be provided capable of detecting a power transmission target power reception apparatus without depending on a power state of the power reception apparatus.

The invention claimed is:

1. A control apparatus used in a power transmission system for transmitting power with a magnetic resonance manner to a power reception apparatus from a power transmission apparatus, the control apparatus comprising
a power controller configured to control a first power transmission state in which power is transmitted by the magnetic resonance manner at a first power value in a state in which at least one power transmission target power reception apparatus is detected, and a second power transmission state in which power is transmitted by the magnetic resonance manner at a second power value greater than the first power value in the state in which the at least one power transmission target power reception apparatus is detected, wherein
the power controller is configured to control the power transmission of the power transmission apparatus to intermittently transmit power at a first transmission interval in the first power transmission state, and
the power controller controls the power transmission of the power transmission apparatus to intermittently transmit power at a second transmission interval shorter than the first transmission interval in the second power transmission state.

2. The control apparatus according to claim 1, wherein the power controller controls transmission power of the power transmission apparatus to transmit power at the first power value in the first power transmission state, and
the power controller controls transmission power of the power transmission apparatus to transmit power at the second power value greater than the first amount of power in the second power transmission state.

3. The control apparatus according to claim 1, wherein the at least one power transmission target power reception apparatus includes a plurality of power transmission target power reception apparatuses, and
the power controller transitions to the second power transmission state when the number of the plurality of power transmission target power reception apparatuses is greater than a predetermined number.

4. The control apparatus according to claim 1, wherein the power controller transitions to the second power transmission state when the at least one power transmission target power reception apparatus includes a power reception apparatus having an application in which an amount of variation in power consumption is greater than a predetermined value.

5. The control apparatus according to claim 1, wherein the power controller transitions to the second power transmission state when a request for executing an application of high power consumption is received from the at least one power transmission target power reception apparatus, or when a request for transitioning to a high load state is received from the at least one power transmission target power reception apparatus.

* * * * *